United States Patent
Kolios et al.

(10) Patent No.: US 11,904,290 B2
(45) Date of Patent: Feb. 20, 2024

(54) DEVICE COMPRISING A PRESSURE-BEARING DEVICE SHELL AND AN INTERIOR SCAFFOLDING SYSTEM

(71) Applicant: BASF SE, Ludwigshafen am Rhein (DE)

(72) Inventors: Grigorios Kolios, Ludwigshafen (DE);
Bernd Zoels, Ludwigshafen (DE);
Hagen Appel, Ludwigshafen (DE);
Jens Bernnat, Ludwigshafen (DE);
Friedrich Glenk, Ludwigshafen (DE);
Dieter Flick, Ludwigshafen (DE);
Gerhard Olbert, Ludwigshafen (DE);
Frederik Scheiff, Ludwigshafen (DE);
Christopher Alec Anderlohr, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 574 days.

(21) Appl. No.: 17/265,623

(22) PCT Filed: Aug. 5, 2019

(86) PCT No.: PCT/EP2019/071031
§ 371 (c)(1),
(2) Date: Feb. 3, 2021

(87) PCT Pub. No.: WO2020/030598
PCT Pub. Date: Feb. 13, 2020

(65) Prior Publication Data
US 2021/0162359 A1   Jun. 3, 2021

(30) Foreign Application Priority Data
Aug. 6, 2018   (EP) .................................... 18187508

(51) Int. Cl.
*B01J 19/24* (2006.01)
*C01B 32/05* (2017.01)
(Continued)

(52) U.S. Cl.
CPC ............... *B01J 19/24* (2013.01); *B01J 3/002* (2013.01); *B01J 3/048* (2013.01); *B01J 6/008* (2013.01);
(Continued)

(58) Field of Classification Search
CPC ... B01J 19/24; B01J 3/002; B01J 3/048; B01J 6/008; B01J 2219/0002; C01B 3/26;
(Continued)

(56) References Cited

U.S. PATENT DOCUMENTS 2,982,622 A   5/1961   Jahnig et al.
5,554,347 A *   9/1996   Busson ................ B01J 19/0013
422/204
(Continued)

FOREIGN PATENT DOCUMENTS

DE             8714113 U1   1/1988
DE       102015202277 B3   4/2016
(Continued)

OTHER PUBLICATIONS

European Search Report for EP Patent Application No. 18187508.9, dated Jan. 25, 2019, 3 pages.
(Continued)

*Primary Examiner* — Daniel C. McCracken
(74) *Attorney, Agent, or Firm* — Grüneberg and Myers PLLC

(57) ABSTRACT

An apparatus contains at least one pressure-rated apparatus shell and at least one modular framework system containing ceramic fiber composite materials and arranged within the apparatus shell. A modular lining apparatus includes the
(Continued)

modular framework system and refractory bricks. The apparatus can be used for high-temperature reactors, especially electrically heated high-temperature reactors.

16 Claims, 12 Drawing Sheets

(51) Int. Cl.
  *B01J 3/00* (2006.01)
  *B01J 3/04* (2006.01)
  *B01J 6/00* (2006.01)
  *C01B 3/26* (2006.01)
  *C04B 35/80* (2006.01)
  *C04B 35/14* (2006.01)
  *C04B 35/18* (2006.01)
(52) U.S. Cl.
  CPC ........... *C01B 3/26* (2013.01); *C01B 32/05* (2017.08); *C04B 35/14* (2013.01); *C04B 35/18* (2013.01); *C04B 35/80* (2013.01); *C04B 2235/522* (2013.01)
(58) Field of Classification Search
  CPC .......... C01B 32/05; C01B 3/042; C01B 3/24; C01B 3/34; C01B 13/0207; C04B 35/14; C04B 35/18; C04B 35/80; C04B 2235/522; C04B 2111/00612; C04B 2235/6021; C04B 2235/96; C04B 2237/34; C04B 2237/343; C04B 2237/348; C04B 2237/368; C04B 2237/704; C04B 2237/76; C04B 38/10; Y02E 60/36; B32B 18/00
  See application file for complete search history.

(56) References Cited

U.S. PATENT DOCUMENTS

| 7,740,474 | B2 | 6/2010 | Scheibel et al. |
| 8,211,524 | B1* | 7/2012 | Gonzalez .............. C04B 37/021 428/116 |
| 2021/0051770 | A1 | 2/2021 | Appel et al. |

FOREIGN PATENT DOCUMENTS

| RU | 2562648 C2 | 9/2015 |
| SU | 909511 A1 | 2/1982 |
| WO | WO-89/05285 A1 | 6/1989 |
| WO | WO-2004/111562 A2 | 12/2004 |
| WO | WO-2007/022750 A2 | 3/2007 |
| WO | WO-2011/018516 A1 | 2/2011 |
| WO | WO-2014/125024 A1 | 8/2014 |
| WO | WO-2019/145279 A1 | 8/2019 |

OTHER PUBLICATIONS

International Search Report for PCT Patent Application No. PCT/EP2019/071031, dated Oct. 15, 2019, 4 pages.
Schmücker, et al., "Faserverstärkte oxidkeramische Werkstoffe", Materialwissenschaft und Werkstofftechnik, vol. 38, Issue 9, Sep. 2007, pp. 698-704.
Russian Office Action dated Dec. 15, 2022, in Russian Application No. 2021105679, 5 pages.

* cited by examiner

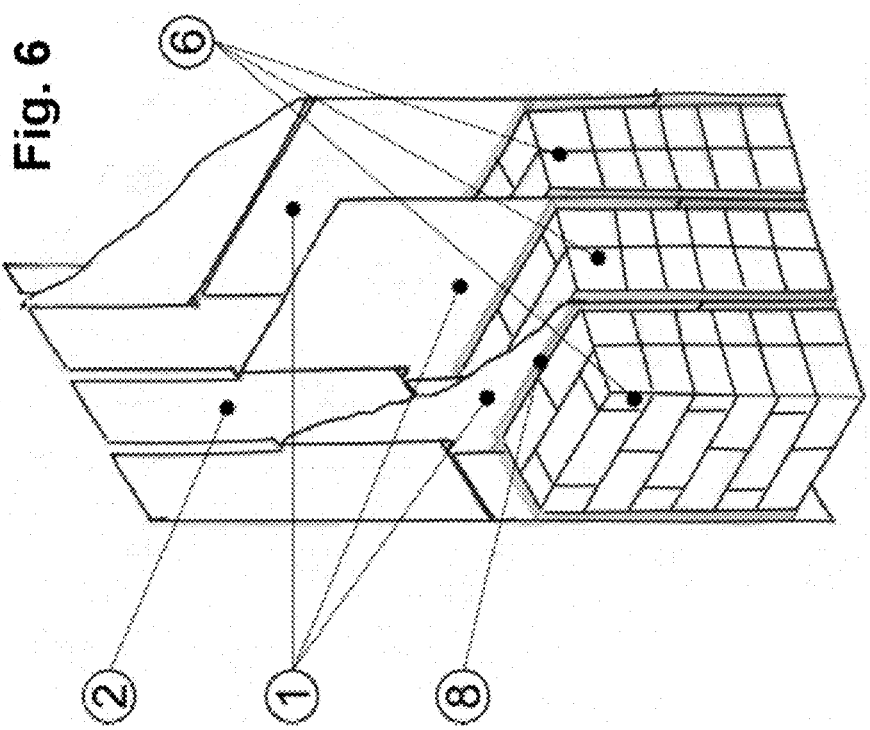
Fig. 6
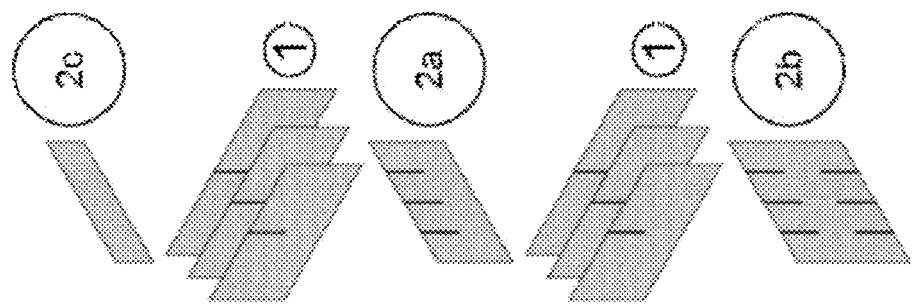
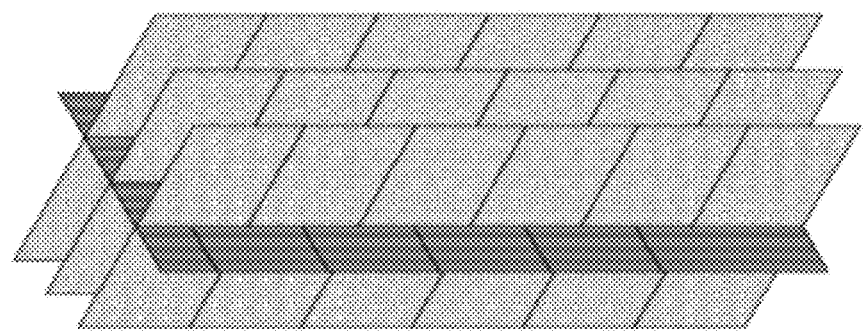

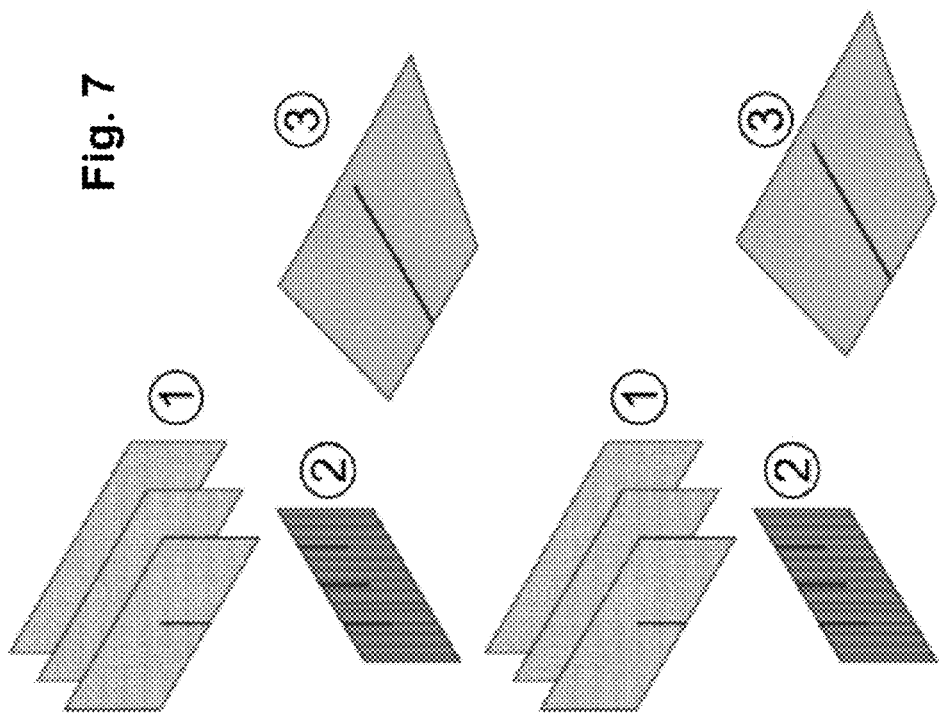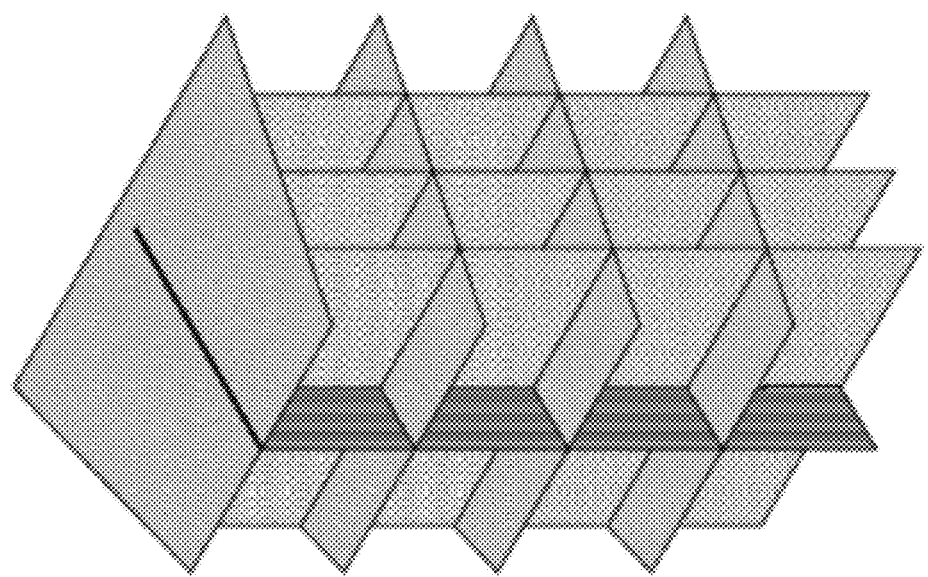
Fig. 7

Fig. 9
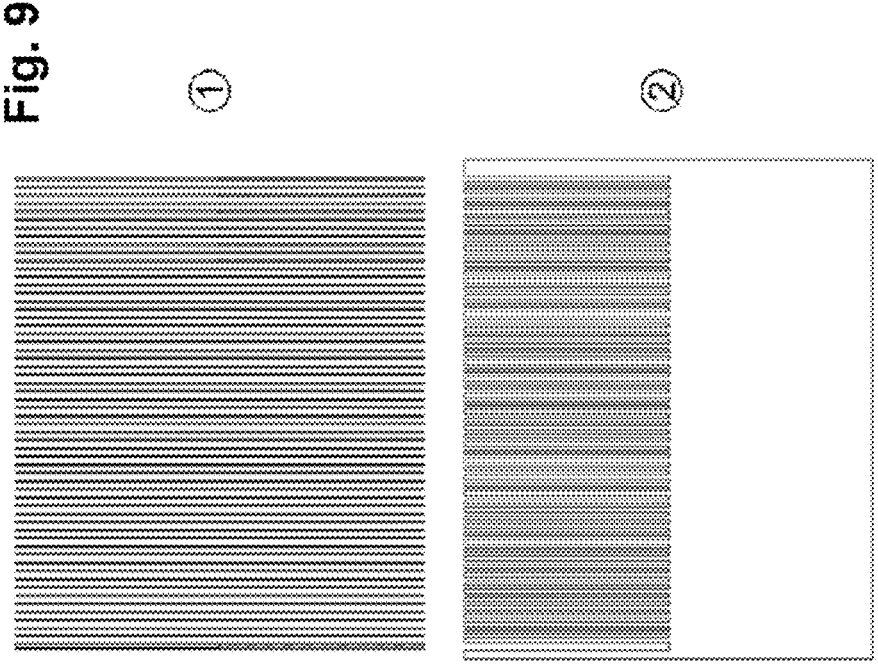
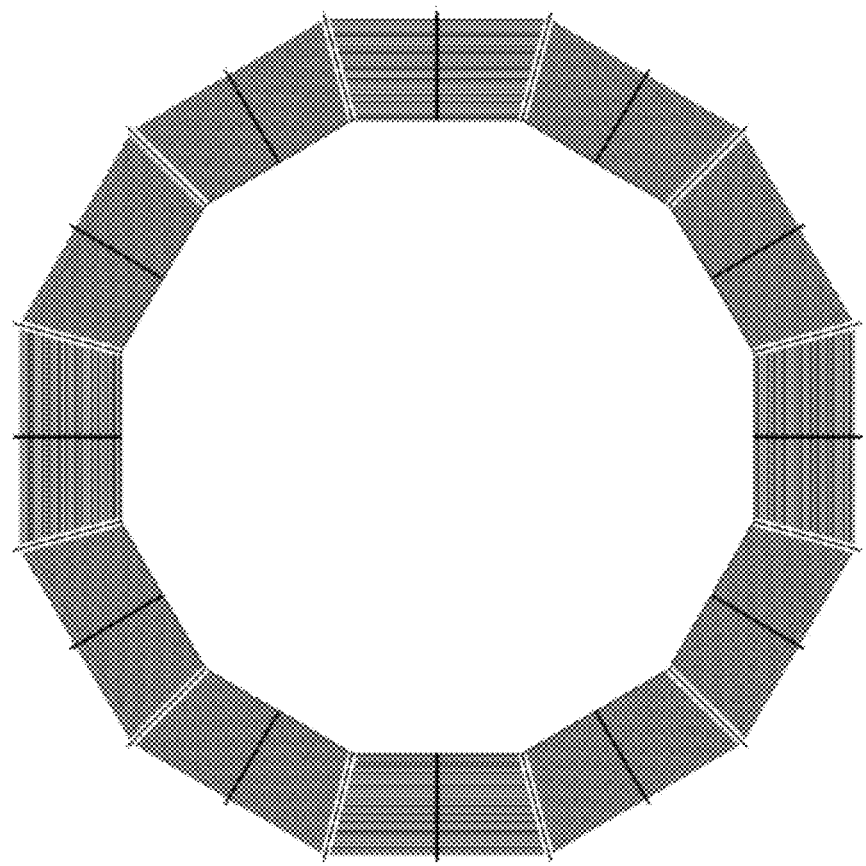

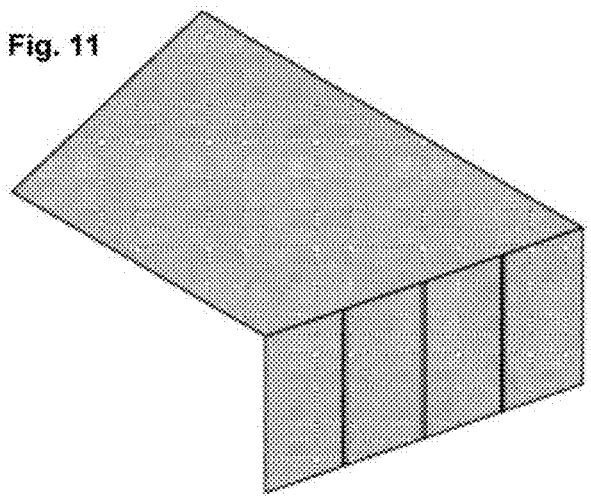
Fig. 11
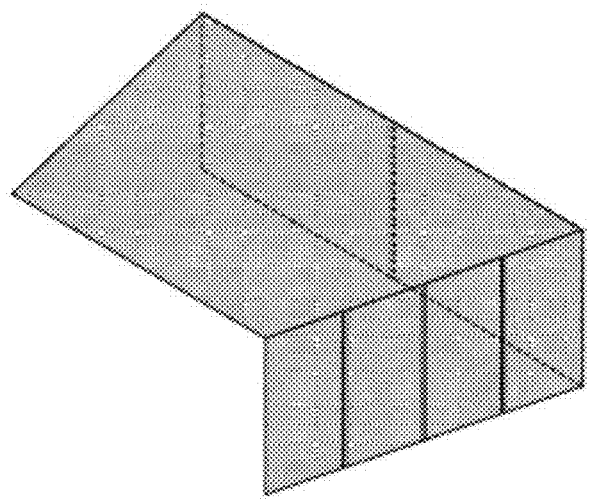
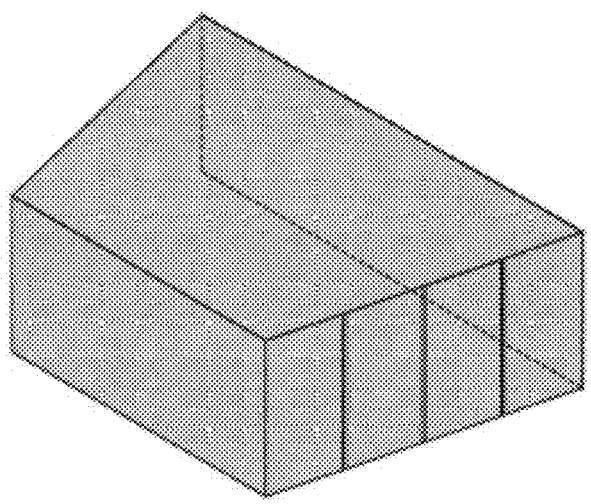

DEVICE COMPRISING A PRESSURE-BEARING DEVICE SHELL AND AN INTERIOR SCAFFOLDING SYSTEM

CROSS-REFERENCE TO RELATED APPLICATIONS

This application is the National Stage entry under § 371 of International Application No. PCT/EP2019/071031, filed on Aug. 5, 2019, and which claims the benefit of European Application No. 18187508.9, filed on Aug. 6, 2018. The content of each of these applications is hereby incorporated by reference in its entirety.

BACKGROUND OF THE INVENTION

Field of the Invention

The present invention relates to an apparatus composed of at least one pressure-rated apparatus shell and at least one modular framework system composed of ceramic fiber composite materials and arranged within the apparatus shell and a modular lining apparatus including, as well as the modular framework system, refractory bricks, and to the use of this apparatus for high-temperature reactors, especially electrically heated high-temperature reactors.

Description of Related Art

Highly endothermic reactions are frequently at the start of the value creation chain in the chemical industry, for example in the cracking of mineral oil fractions, the reforming of natural gas or naphtha, the dehydrogenation of propane, the dehydroaromatization of methane to benzene, or the pyrolysis of hydrocarbons. Temperatures between 500° C. and 1700° C. are required to achieve yields of industrial and economic interest. The main reason for this lies in the thermodynamic limitation of the equilibrium conversion.

Endothermic reactions for preparation of commodity products in the chemical industry, owing to the high temperatures, require effective thermal insulation of the reactor from the environment. Moreover, pressure-resistant reaction zones are required for some reactions, such that the reaction chamber has to be hermetically sealed from the environment apart from defined inlets and outlets. In addition, some of the endothermic reactions mentioned are conducted under reducing conditions. Moreover, endothermic reactions require an effective concept for the supply of heat. In the case of direct electrical heating, the reactor interior, for example a bed, additionally has to be electrically insulated from the lateral reactor shell.

DE 87 14 113 U1 describes a modular pressure vessel, the pressure-rated shell of which consists of even flat metallic rings layered one on top of another, which are optionally held together by tension elements in a vertical arrangement. The vessel base and/or lid may optionally have been formed from closely adjacent, individual rib elements that run in a star shape from the vessel wall toward the axis. It is stated that there may be a flat insulation layer of ceramic on the inner vessel wall; in addition, this insulation layer may be protected by a thin metallic layer, called a "vest". A disadvantage of this prior art is that the ceramic insulation layer is bonded in a fixed manner to the pressure-rated shell. Moreover, the metallic vest that separates the ceramic layer from the reaction volume is electrically conductive and less thermally stable than the ceramic lining. As a result, this solution is not applicable to reactors with electrically heatable packing. Moreover, there is no disclosure of how the unit consisting of pressure-rated shell, ceramic insulation layer and metallic vest is supposed to compensate for thermal expansion.

U.S. Pat. No. 2,982,622 discloses a concept for the electrical heating of endothermic reactions. This involves passing electrically conductive particles as a fluidized bed through the reaction chamber.

Electrodes are used to guide an electrical current through the bed of particles, which in this way functions as a resistance heater and brings about direct heating of the reaction chamber. The countercurrent flow of the gas stream and particle stream achieves efficient thermal integration within the apparatus, such that the high-temperature region is localized in the middle part of the reaction chamber, while the upper and lower edge of the reactor remain cold. This principle is applicable to numerous endothermic reactions of industrial relevance. The POT application with application number PCT/EP2019/051466 specificizes the execution of the electrical heating and discloses a heatable packed apparatus for performance of endothermic reactions, wherein the vertical electrodes are arranged in an electrically conductive solid packing and the electrodes are connected via the entire upper or lower dome of the reactor and the current-conducting connecting elements have large contact areas with the electrodes.

In the reactors for high-temperature reactions, linings are typically used that protect the pressure-rated metal shell of the reactor from the effect of high temperatures, lower heat losses and/or protect the metal shell from electrical power. These linings must in some cases withstand very high temperatures and pressures, chemical corrosion attack, erosion by particles and thermal cycling stress. The thermal cycling stresses can result, for example, from the batchwise mode of operation and the introduction of cold process materials.

The demands on the refractory lining for chemical high-temperature reactions are accordingly varied and some are contradictory. Firstly high insulation capacity and low apparent density/high porosity are required, and secondly sufficient mechanical strength but likewise good processability. In addition, high thermal stability under various atmospheric conditions is required.

Reactor concepts that dispense with a thermal lining, for example the Lurgi pressure gasifier, have a double-wall pressure shell having forced cooling with water. The advantages of this concept are the simple construction and low weight of the reactor and the low thermal stress on the reactor shell. A disadvantage of this concept is the complexity in terms of construction and control technology, and the lack of failsafe operation of the cooling system. Moreover, this concept is unsuitable for reactors with direct electrical heating, where electrical current has to be passed through a bed. In this case, a short circuit would arise between the bed and the pressure-rated reactor shell.

Typically, refractory bricks are used for a lining. Naturally, these fired refractory products have an open porosity in the range, for instance, between 13% and 20% by volume. Process substances such as slags, melts or gases can penetrate into these open pores and destroy the brick by chemical reactions and/or lead to completely altered thermomechanical properties of the structure. Cyclical chemical attacks and cyclical thermal and thermomechanical stresses lead to accelerated wear and to damage, for example to flaking-off of large pieces that can have a thickness of several millimeters. The lifetime is therefore limited and, on attainment of a particular degree of wear, exchange of the respective lining is required, which is associated with high inconvenience and cost.

A further disadvantage of these porous materials is that there can be convection flows in the bricks at relatively high reaction pressures over and above about 10 bar, which can boost the transfer of heat to the pipe wall and hence lower the insulation performance.

Refractory brick materials disclosed in the prior art include Al2O3 (corundum), phosphate-bound Al2O3, cement-bound Al2O3, chromium corundum Al2O3-Cr2O3 ("Aurex 75" and "Aurex 90", Radex-BCF), MgO—Cr2O3, Cr2O3, Al2O3-Cr2O3-ZrO2 ("Zichrom 60"), Cr2O3-ZrO2 ("Zichrom 90"), AlPO4, CrPO4 ("Aurex 95P") [Gehre, P. (2013). Korrosions-und thermoschockbeständige Feuerfestmaterialien fër Flugstromvergasungsanlagen auf Al2O3-Basis-Werkstoffentwicklung und Korrosionsuntersuchungen [Corrosion- and Thermal Shock-Resistant Refractory Materials for Entrained Flow Gasification Plants Based on Al2O3—Material Development and Corrosion Studies]. Thesis, Technische Universität Bergakademie Freiberg, chapter 2.3.1]. Also known as refractory material are silicon carbide and carbon, preferably in the form of graphite. A refractory brick material disclosed as having particular thermal shock resistance is 6% by weight ZrO2-Cr2O3-Al2O3.

Also disclosed as refractory brick materials in DE 10 2015 202 277 and WO 89/5285 are brick materials composed of foamed ceramics. A disadvantage of the construction of a lining consisting of exclusively refractory bricks is that it has to be supported in order to absorb horizontal forces, for example the load of a bed. Furthermore, a lining consisting exclusively of refractory bricks is prone to cracks resulting from the thermal expansion of the construction. Without support, bricks can become detached from the lining. As a result, the lining can be structurally weakened and collapse and/or lose its insulating action and hence cause damage to the shell of an apparatus.

The search for thermally stable supporting structures is also known in the field of processes for thermal treatment of components. WO 2011/18516 and WO 2004/111562 disclose planar modular workpiece supports that consist of fiber ceramics as framework elements, for example carbon fiber-reinforced carbon composite material. A disadvantage of these supports is that they are only loosely borne on the supporting substrate. Without firm anchoring, they cannot absorb horizontal forces as arise, for example, from the load of a bed. Moreover, the workpiece supports do not have any function as thermally and electrically insulating layers.

U.S. Pat. No. 8,211,524 discloses an anchor structure composed of ceramic fiber composite materials that connects a metallic substrate to a ceramic insulation layer. The structure of the ceramic fiber composite material projects into the metallic layer and into the ceramic layer and is bonded thereto in a form-fitting manner. A disadvantage of this anchor structure is that it is rigidly bonded both to the ceramic layer and to the metallic layer. This connection cannot be parted without destroying the structure.

Linings are currently in commercial use, for example, in blast furnace processes, in the partial oxidation of hydrocarbons to synthesis gas and in metallurgy (carbide process). For example, a blast furnace is lined zone by zone with appropriate materials: (i) furnace top with firebrick with 39-42% by weight of $Al_2O_3$ (conventional) or the newer material Super-duty firebrick, (ii) shaft with firebrick with 39-42% by weight of $Al_2O_3$ (conventional) or the newer material corundum, SiC—Si3N4, (iii) belly with firebrick with 62% by weight of $Al_2O_3$, mullite (conventional) or the newer material SiSiC, (iv) bosh with firebrick with 42-62% by weight of $Al_2O_3$, mullite, carbon (conventional) or the newer material SiC, chromium corundum, (v) hearth with 42-62% by weight of $Al_2O_3$, mullite, carbon (conventional) or the newer material carbon/graphite with super micropores.

The prior art discloses various executions of fixtures for linings ("Feuerfestbau" [Refractory Construction] from the Deutsche Gesellschaft Feuerfest- und Schornsteinbau e.V. [German Society of Refractory and Chimney Construction]): In industrial apparatuses, the refractory materials are typically connected by anchors to the supporting construction, for example a steel construction. The anchors may consist of ceramic or metallic materials. Ceramic anchors are always bonded by a metallic holding element to the steel construction. The holding (anchor) bricks must have the same quality as the material on the hot side (inside). The selection of type and material depends on the requirements that result from the construction of the component and thermal stress and corrosion stress.

It is also stated that the refractory bricks are used to construct a wall and, at particular intervals, are secured to a metal wall with specific steel anchors. To secure the brickwork and to control thermal expansion, there is a need for an arrangement of metallic consoles of heat-resistant steel that support the bricks at particular intervals. The bricks are of about the size of conventional bricks and are joined with mortar in a customary manner.

It is also stated that every brick is secured by a plate mount to the pipe wall to be protected. For example, every plate is borne at one end by a pin welded to the pipe wall and retained in wall direction, and secondly bonded to the pipe wall by means of an SiC mortar. Alternatively, every plate is suspended on a plate fixture pin that projects obliquely upward from the pipe wall.

Also disclosed are thermally insulating linings of industrial ovens with refractory blocks and steel anchors, wherein a circumferential groove has been shaped in the narrow sides of each brick, such that a steel anchor meshes by a point into the groove of a block and the blocks are anchored in a circumferentially form-fitting manner by means of set refractory composition.

All linings described in the prior art are supported on the pressure-rated reactor shell, usually a metallic wall. The choice to use the pressure-rated wall as support for the lining has its advantage in the simple construction of this construction unit.

A weakness of the linings is the connections between metallic anchors and the anchor bricks. As a result of the different coefficients of expansion of the materials in combination with temperature differentials and mechanical stress, these connections can part. As a consequence, the lining can lose purchase over a large area. Thus, blocks can fall out of the lining. The resultant gaps can lead to consequent damage. For example, the thermal insulation between the reaction zone and the pressure-rated reactor wall is weakened, and so the pressure-rated wall overheats. It is also possible, for example, for particles from the bed in the reaction zone to penetrate into the gaps and cause an electrical short circuit between the bed and the pressure-rated reactor wall.

A frequently encountered problem in lining systems is the proneness of the lining to damage in the event of excessively rapid changes in temperature since, for example, lining and pressure-rated reactor wall have different coefficients of thermal expansion and additionally are heated at different speeds. Since the freedom of movement of individual bricks is restricted by the fixture, in the event of abrupt changes in temperature, stress-free deformation or movement of the bricks may be inhibited to such an extent that they break or damage the fixture. This can occur even in the event of a single instance of a rapid local change in temperature, for example as a result of a fault.

The compensation of differences in thermal expansion is achieved in the prior art by the use of expansion joints between the bricks of the lining. The weakness of these expansion joints is the formation of gaps in the structure of the lining, into which particles and gases can penetrate from the reaction zone. This can give rise to undefined and unwanted bypass flows. In order to get around this problem on startup, it is necessary to choose very slow heating rates, generally <3 K/min. The resulting long startup times can significantly impair the effective capacity of high-temperature reactors.

The mechanical connection of the lining to the pressure-rated wall restricts assembly, accessibility and ease of repair of the apparatus. For example, it is not possible to raise the reactor shell from the reactor base. Moreover, damaged individual bricks can be repaired or replaced only by complete deinstallation of the lining.

In the linings disclosed in the prior art, in summary, the following demands remain unresolved:

The electrical insulation of the lining is insufficiently assured.

Active cooling of the reactor shell is critical from a safety point of view (failsafe operation, contamination of the reactor contents and unwanted side reactions).

Variations in temperature and/or pressure can destroy the lining and cause considerable subsequent damage to the reactor structure.

The high mass of the lining makes it difficult to handle the reactor.

Assembly and disassembly, for example after faults, is difficult and complex.

The startup and shutdown characteristics are slow and sluggish, for example cooling in the event of faults.

Consequently, for high-temperature pressure reactions, there is a lack of solutions for good thermal insulation and low gas permeability of the lining in the range of high temperatures, and for mechanical and electrochemical separation between the lining and the pressure-rated shell.

SUMMARY OF THE INVENTION

The underlying object was accordingly that of disclosing a modular self-supporting apparatus that serves as electrical and/or thermal insulation and is separated mechanically from the pressure-rated reactor shell. A further object was that of disclosing a modular, self-supporting framework for lining of high-temperature reactions, in order to achieve mechanical separation of the lining from the reactor shell. A further object was that of disclosing a lining that enables simple electrical insulation in apparatus terms between the reaction zone within the reactor and the pressure-rated reactor shell. A further object was that of disclosing a lining that withstands a reaction pressure of up to 60 bar and at the same time reliably retains its thermally insulating effect. A further object was that of disclosing a lining that exhibits a long lifetime by virtue of elevated chemical corrosion resistance, elevated thermal cycling stability and elevated resistance to material flaking.

BRIEF DESCRIPTION OF THE DRAWINGS

FIG. 6 shows perspective diagrams of a segment in a framework consisting of transverse elements and lateral elements in sheet form.

FIG. 7 shows perspective diagrams of a segment in a framework consisting of transverse elements, lateral elements, and flat elements in sheet form.

FIG. 9 shows an illustrative framework having many rows of transverse elements in radial direction and a detailed side view of a lateral element and a bundle of transverse elements.

FIG. 11 shows perspective diagrams of complex framework element forms.

DETAILED DESCRIPTION OF THE INVENTION

Figure 1:
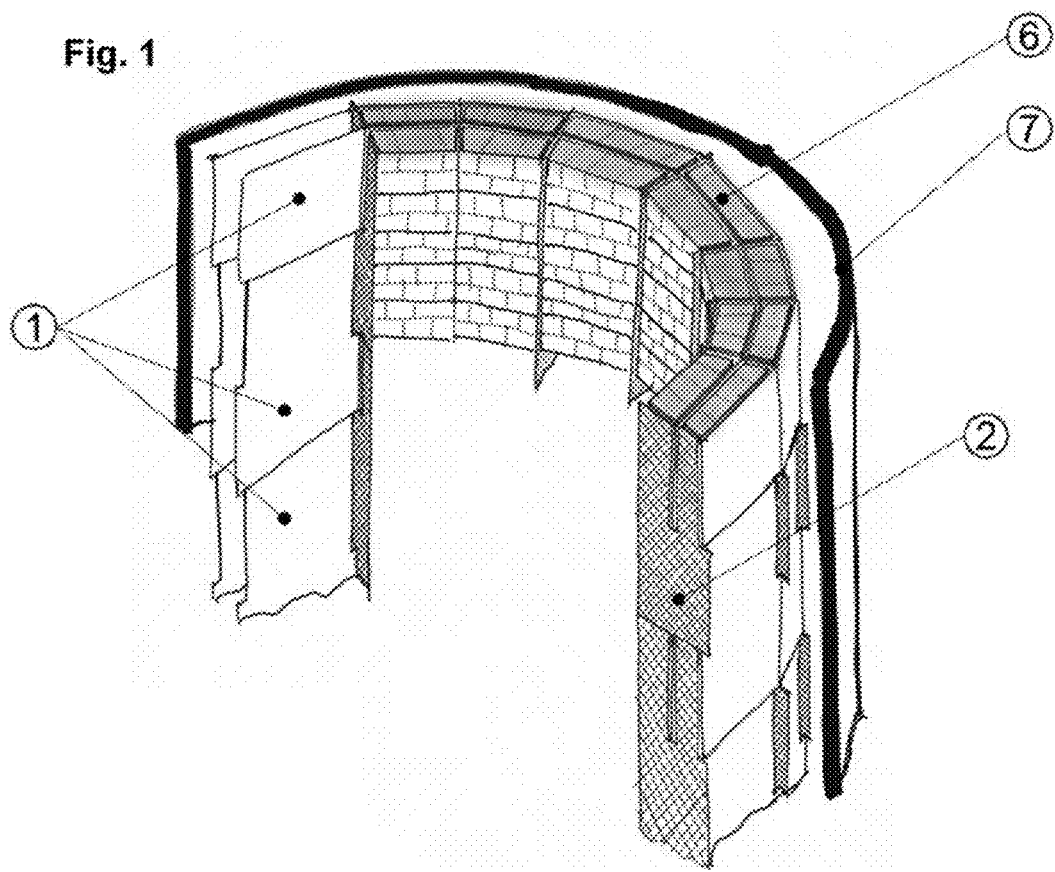
FIG. 1 shows a diagram of a reactor segment with a pressure-rated reactor shell around an OCMC framework filled with refractory bricks.

What has surprisingly been disclosed is an apparatus system, especially a reactor, composed of at least one pressure-rated apparatus shell and at least one modular framework system composed of at least two different types of framework element and arranged within the apparatus shell, wherein multiple transverse elements form at least one prism or one cylinder and multiple lateral elements project into the interior of the prism or cylinder, where the transverse elements and the lateral elements can be inserted into one another and/or can be connected with the aid of one or more connecting elements, where the material of the framework elements includes ceramic fiber composite materials.

What has further been disclosed is a self-supporting framework system including ceramic fiber composite materials that has refractory bricks including foamed ceramic materials, wherein the bricks are supported by the modular framework system of the invention.

There follows a description of the internal modular framework system:

Preferably, the transverse elements form an equilateral prism with a polygon as its base, or a homogeneous cylinder with a circle as its base.

Preferably, the cutouts take the form of slots or holes, advantageously with hole shapes as described in DIN 24041, for example elongated holes, preferably angular elongated holes or elongated holes having rounded corners.

Connecting elements used may advantageously be form-fitting and/or cohesive connections between the transverse elements and the lateral elements, for example combined plug connections and adhesive bonds, preferably mortising, rabbeting or dovetailing.

"Framework" in the present invention is understood to mean: vertical framework elements that are preferably connected crosswise to one another and can absorb lateral forces of a possible lining in two dimensions. The framework can advantageously divide the lining into segments that may be bounded in radial direction and in circumferential direction.

"Self-supporting" in the present invention is understood to mean a framework that does not require any supports, especially any lateral supports by a wall, even at pressures up to 60 MPa. Within the framework, the loss of flow and what are called the silo forces of a possible bed can result in stresses of about 0:5 MPa.

"Pressure-rated apparatus shell or pressure-rated reactor shell" is understood to mean the boundary of a vessel that withstands a pressure differential between the interior and the environment of the vessel. The pressure-rated reactor shell comprises essentially three sections: the lower end, the upper end and the lateral wall of the vessel.

"Lining" is understood to mean a protection consisting of sheets, bricks or moldings that may be bonded by mortar or cement, including sealing or insulating intermediate layers; in addition, this is understood to mean all supported layers and ceramic internals that are largely resistant to mechanical, thermal and chemical influences (DIN 28060 and DIN 28071). Since 1986, the German term Ausmauerung [bricklining] has been replaced by Auskleidung [lining] (DIN 28071).

"Segment" is understood to mean the module units of the framework in circumferential direction. The transverse elements define the delimitation of the segments in radial direction. The lateral elements define the position of the segments in circumferential direction, where the gaps between the adjacent transverse elements in circumferential direction or the separating elements that are inserted into these gaps bound the segment in circumferential direction (see FIGS. 2 to 4).

Figure 2:
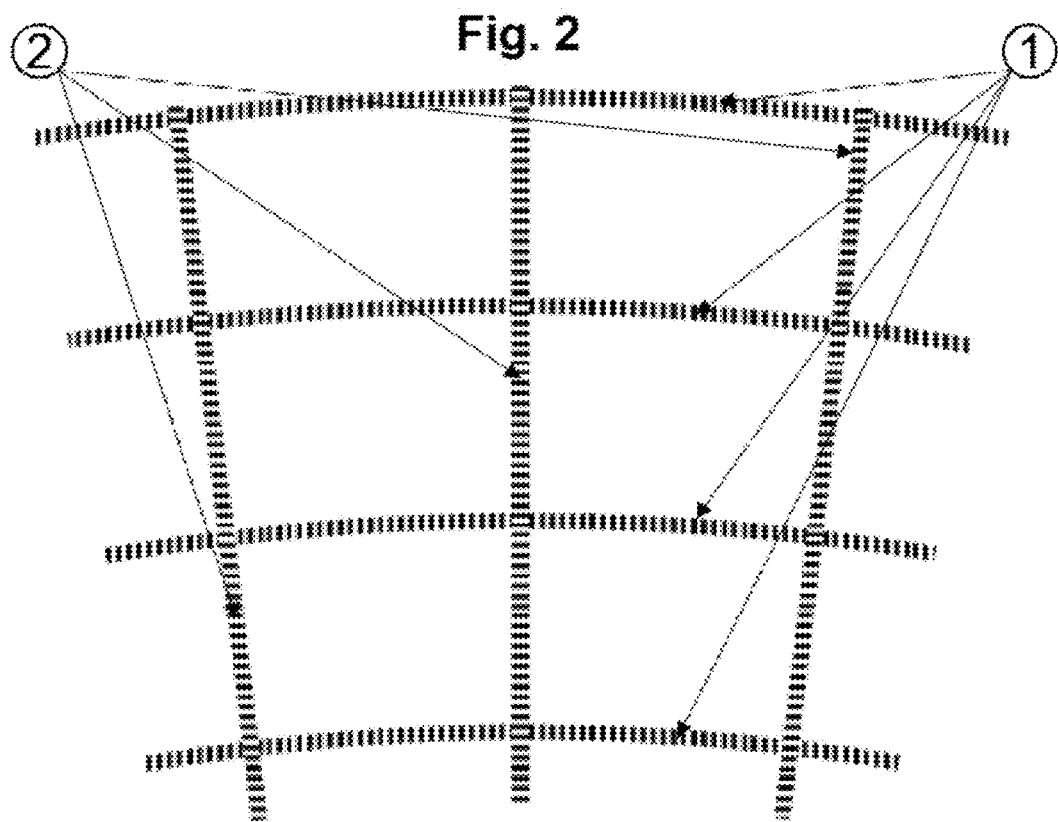
FIG. 2 shows a top view of a segment of a segmented framework formed from transverse elements and lateral elements, with four transverse elements and three lateral elements per layer.
Figure 3:
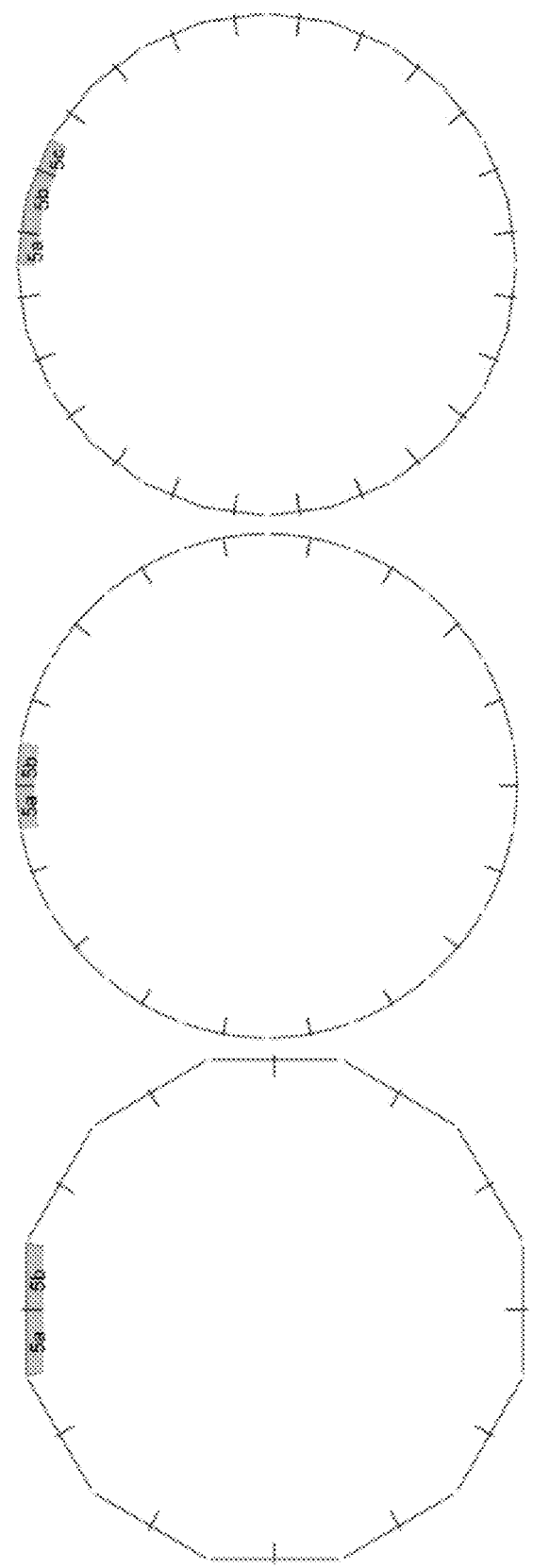
FIG. 3 shows top views of segmented frameworks formed from transverse elements and lateral elements, with one transverse element per layer.
Figure 4:
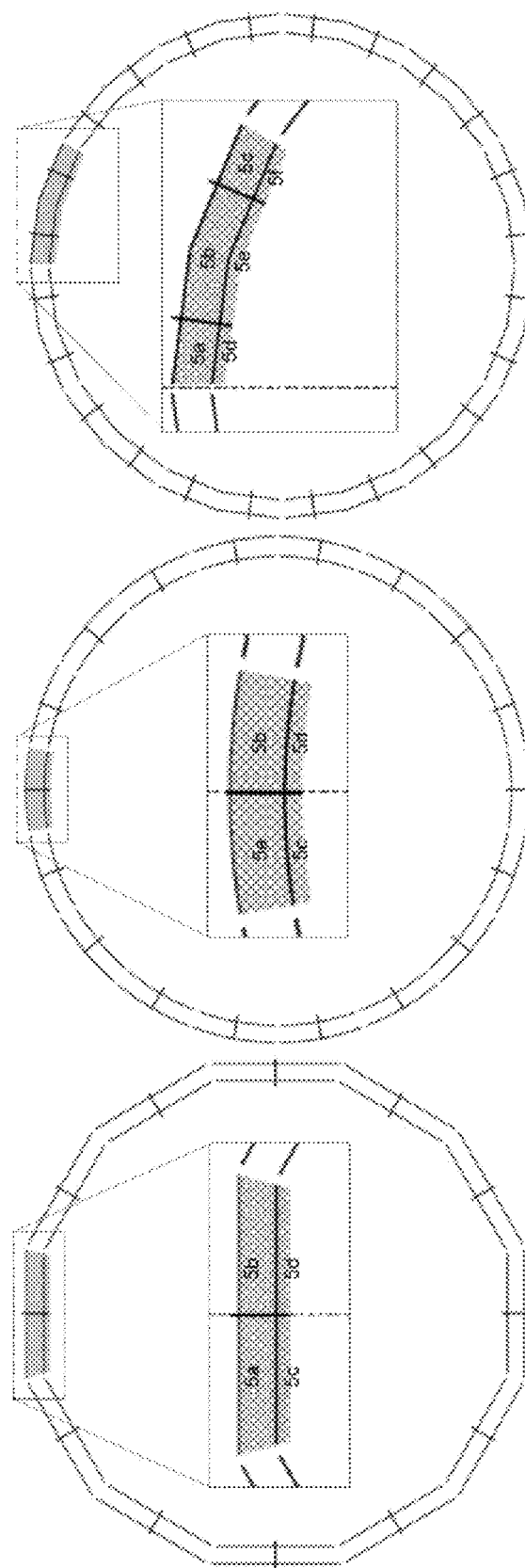
FIG. 4 shows top views of segmented frameworks formed from transverse elements and lateral elements, with two transverse elements per layer.

A "box" is understood to mean the region enclosed by two parallel transverse elements or transverse elements in the form of concentric elliptical arcs, preferably parallel transverse elements or transverse elements in the form of concentric circular arcs, that are adjacent in radial direction and the corresponding lateral elements, and any gap between the adjacent transverse elements in circumferential direction or the separating element advantageously inserted into this gap (see FIGS. 2 to 4).

The words "front" or "front side" are understood to mean the area facing the inside of the reactor. The words "back", "outer" or "reverse side" are understood to mean the area facing the outer circumference of the reactor. The words "top", "bottom" and "side" relate to an upright reactor. The words "bottom", "middle" and "top" are used in the geodetic sense.

"Ceramic fiber composite materials" are understood to mean fiber-reinforced ceramic, especially oxide-ceramic, materials as described, for example, in M. Schmücker, "Faserverstärkte oxidkeramische Werkstoffe" [Fiber-Reinforced Oxide-Ceramic Materials], Materialwissenschaften rand Werkstofftechnik, 2007, 38, No. 9, 698-704. A ceramic fiber composite material comprises a fiber framework, a woven fabric, a nonwoven scrim, a knitted fabric and/or a braid of ceramic fibers and a filler matrix of sintered ceramic powder.

The fiber composite materials are accordingly characterized by a matrix of ceramic particles between which ceramic fibers, especially continuous fibers having a fiber length of >50 mm are embedded as winding form or as textile. They are called fiber-reinforced ceramic, composite ceramic or else fiber ceramic. Matrix and fiber may in principle consist of any known ceramic materials, and carbon is also treated as a ceramic material in this connection.

"Oxidic fiber composite ceramic or oxidic fiber composite materials" is understood to mean a matrix of oxidic ceramic particles comprising ceramic, oxidic and/or nonoxidic fibers.

Preferred oxides of the fibers and/or the matrix are oxides of an element from the group of: Be, Mg, Ca, Sr, Ba, rare earths, Th, U, Ti, Zr, Hf, V, Nb, Ta, Cr, Mo, W, Mn, Fe, Co, Ni, Zn, B, Al, Ga, Si, Ge, Sn, Li, Na, K, Rb, Cs, Re, Ru, Os, Ir, Pt, Rh, Pd, Cu, Ag, Au, Cd, In, TI, Pb, P, As, Sb, Bi, S, Se, Te, and mixtures of these oxides.

The mixtures are advantageously suitable both as material for the fiber and for the matrix. Fiber and matrix need generally not be made of the same material.

In principle, not just binary mixtures but also tertiary and higher mixtures are suitable and of significance. In a mixture, the individual constituents may occur in an equimolar amount, but advantageous mixtures are those that have a significantly different concentration of the individual constituents of the mixture, up to and including dopings in which one component occurs in concentrations of <1%.

Particularly advantageous mixtures are as follows: binary and ternary mixtures of aluminum oxide, zirconium oxide and yttrium oxide (e.g. zirconium oxide-reinforced aluminum oxide); mixtures of silicon carbide and aluminum oxide; mixtures of aluminum oxide and magnesium oxide (MgO spinel); mixtures of aluminum oxide and silicon oxide (mullite); mixture of aluminum silicates and magnesium silicates, ternary mixture of aluminum oxide, silicon oxide and magnesium oxide (cordierite); steatite (magnesium silicate); zirconium oxide-reinforced aluminum oxide; stabilized zirconium oxide ($ZrO_2$): stabilizers in the form of magnesium oxide (MgO), calcium oxide (CaO) or yttrium oxide ($Y_2O_3$), other stabilizers used include cerium oxide ($CeO_2$), scandium oxide ($ScO_3$) or ytterbium oxide ($YbO_3$); and also aluminum titanate (stoichiometric mixture of aluminum oxide and titanium oxide); silicon nitride and aluminum oxide (silicon aluminum oxynitride SIALON).

Zirconium oxide-reinforced aluminum oxide used is advantageously $Al_2O_3$ with 10 to 20 mol % of $ZrO_2$. $ZrO_2$ can advantageously be stabilized using 10 to 20 mol % of CaO, preferably 16 mol %, 10 to 20 mol % of MgO, preferably 16, or 5 to 10 mol % of $Y_2O_3$, preferably 8 mol % ("fully stabilized zirconium oxide"), or 1 to 5 mol % of $Y_2O_3$, preferably 4 mol % ("partly stabilized zirconium oxide"). An advantageous ternary mixture is, for example, 80% $Al_2O_3$, 18.4% $ZrO_2$ and 1.6% $Y_2O_3$.

As well as the materials mentioned (mixtures and individual constituents), fibers of basalt, boron nitride, tungsten carbide, aluminum nitride, titanium dioxide, barium titanate, lead zirconate titanate and/or boron carbide in an oxidic ceramic matrix are also conceivable.

Useful fibers include reinforcing fibers that are covered by the classes of oxidic, carbidic, nitridic fibers or C fibers and SiBCN fibers. More particularly, the fibers of the ceramic composite material are aluminum oxide, mullite, silicon carbide, zirconium oxide and/or carbon fibers. Mullite consists of solid solutions of aluminum oxide and silicon oxide. Preference is given to the use of fibers of oxide ceramic ($Al_2O_3$, $SiO_2$, mullite) or of nonoxide ceramic (C, SIC).

It is advantageously possible to use creep-resistant fibers, i.e. fibers that, within the creep range—within the temperature range up to 1400° C.—have a minimal increase, if any, in lasting deformation over time, i.e. tendency to creep. The company 3M reports, for the NEXTEL fibers, the following limiting temperatures for lasting extension of 1% after 1000 h under a tensile stress of 70 MPa: NEXTEL 440: 875° C., NEXTEL 550 and NEXTEL 610: 1010° C., NEXTEL 720: 1120° C. (reference: Nextel™ Ceramic Textiles Technical Notebook, 3M, 2004).

The fibers advantageously have a diameter between 1 and 50 μm, preferably between 5 and 20 μm, more preferably 8 and 15 μm. They are advantageously interwoven—typically in plain weave or satin weave—to give textile sheets, knitted to form hoses or wound around a form as fiber bundles. For production of the ceramic composite system, the fiber bundles or weaves are infiltrated, for example, with a slip comprising the components of the later ceramic matrix, advantageously $Al_2O_3$ or mullite (Schmücker, M. (2007), Faserverstärkte oxidkeramische Werkstoffe, Materialwissenschaft and Werkstofftechnik, 38(9), 698-704). Heat treatment at >700° C. ultimately gives rise to a high-strength composite structure composed of the ceramic fibers and the ceramic matrix with a tensile strength of advantageously >50 MPa, preferably >70 MPa, further preferably >100 MPa, especially >120 MPa.

Preferably, the ceramic fiber composite material used is $SiC/Al_2O_3$, SiC/mullite, $C/Al_2O_3$, C/mullite, $Al_2O_3$, $Al_2O_3$/mullite, mullite/$Al_2O_3$ and/or mullite/mullite. The material before the slash here denotes the fiber type and the material after the slash the matrix type. Matrix systems used for the ceramic fiber composite structure may also be siloxanes, Si precursors and a wide variety of different oxides, for example including zirconium oxide. Preferably, the ceramic fiber composite material comprises at least 99% by weight of $Al_2O_3$ and/or mullite.

In the present invention, preference is given to using fiber composite materials based on oxide ceramic fibers, for example 3M™ NEXTEL™ 312, NEXTEL™ 440, NEXTEL™ 550, NEXTEL™ 610, NEXTEL™ 720 or the MvM 1415N, MvM 1415N-2220, AvM 1415N, AvM 1415N-3000, FW12 and/or FW30 products from the manufacturer Walter E. C. Pritzkow Spezialkeramik. Particular preference is given to the use of NEXTEL 610, NEXTEL 720, and the AvM 1415N-3000 and/or FW30 products. In addition, it is advantageously possible to use fibers from Nitivy, Japan.

The matrix advantageously has a fill level of fibers (proportion by volume of the fibers in the composite structure) of 20% to 40%; the total solids content of the composite structure is advantageously between 50% and 80%. Fiber composite ceramics based on oxidic ceramic fibers are chemically stable in an oxidizing and in a reducing gas atmosphere (i.e. no change in weight after storage in air at 1200° C. over 15 h (reference: Nextel™ Ceramic Textiles Technical Notebook, 3M, 2004)) and are thermally stable to above 1300° C. Fiber composite ceramics have quasi-ductile deformation characteristics. They are thus stable to thermal cycling and have quasi-ductile fracture characteristics. Thus, there are signs of the failure of a component before it breaks.

The fiber composite material advantageously has a porosity of 20% to 50%; it is accordingly not gastight by the definition in DIN 623-2. The fiber composite material advantageously has a long-term use temperature of up to 1500° C., preferably up to 1400° C., more preferably up to 1300° C. The fiber composite material advantageously has a strength >50 MPa, preferably >70 MPa, more preferably >100 MPa, especially >120 MPa. The fiber composite material advantageously has a yield point of elastic deformation of 0.2% to 1%. The fiber composite material advantageously has a thermal cycling stability to DIN EN 993-11. The fiber composite material advantageously has a coefficient of thermal expansion [ppm/K] of 4 to 8.5. The fiber composite material advantageously has a thermal conductivity of 0.5 to $5 \frac{W}{m \cdot K}$.

The ceramic fiber composite material can advantageously be produced by CVI (chemical vapor infiltration) methods, pyrolysis, especially LPI (liquid polymer infiltration) methods, or by chemical reaction such as LSI (liquid silicon infiltration) methods.

The framework is advantageously of modular construction in circumferential direction (see FIGS. 2 to 4). The framework is advantageously of modular construction in the upward direction (see FIGS. 5 and 6). The module units in circumferential direction are referred to as segments. The module units in vertical direction are referred to as layers. The modular framework has at least two different types of framework element: The first type of framework elements defines the delimitation of the segments, preferably lining segments, in radial direction. These framework elements are referred to as transverse elements. The second type of framework elements defines the position of the segments, preferably the lining segments, in circumferential direction. These framework elements are referred to as lateral elements.

Advantageously, the framework may comprise further framework elements. Such elements are advantageously inserted into the gaps between two adjacent transverse elements in circumferential direction (see FIG. 5). These elements are also referred to as separating elements. Alternatively, the lateral conclusion of the segments can advantageously be achieved by additional lateral elements.

Further elements may advantageously be interleaved horizontally between two mutually superposed layers of transverse elements (see FIG. 7). These elements are referred to as flat elements. The flat elements may advantageously form barriers against the formation of large-area convection clusters in the porous structure of a possible lining. In addition, the flat elements advantageously allow the locally limited exchange of possible bricks of a lining without disassembling the entire framework.

The transverse elements advantageously take the form of flat or angled, rectangular plates or of cylindrical shells ("a cylinder is a figure which is bounded by a cylindrical surface with a closed directrix and two parallel planes, the main surfaces of the cylinder", Bronstein, page 251, FIG. 2.49).

In addition, the transverse elements may take the form of corrugated sheets. The corrugations may be sinusoidal or triangular. The amplitude is advantageously 1 mm to 100 mm, preferably 2 mm to 50 mm, especially 3 mm to 20 mm. The wavelength is advantageously 2 mm to 500 mm, preferably 5 mm to 200 mm, especially 10 mm to 100 mm.

In top view, the transverse elements form one or more polygons, preferably regular polygons, or one or more concentric ellipses, preferably one or more concentric circles. Corrugated transverse elements in top view have the shape of a periodic function or a trochoid. The lateral elements are advantageously arranged in a star shape (see FIGS. 2 to 5).

A prism, with a polygonal base surface, advantageously has three to sixty transverse elements, preferably four to forty transverse elements, especially six to twenty-four transverse elements. The cylinder, with an elliptical, especially circular, base surface, advantageously has three to sixty ellipsoidal transverse elements, preferably in the form of circular arcs, preferably four to forty transverse elements, especially six to twenty-four transverse elements. The diameter of the cylinder, preferably with an ellipse, especially a circle, as the base surface, or the diagonal of the polygon, preferably the regular polygon, is advantageously between 0.2 m and 20 m, preferably between 0.5 m and 15 m, especially between 1 m and 10 m.

The size of the gap between two adjacent transverse elements in circumferential direction is advantageously 0 to 200 mm, preferably 1 to 100 mm, further preferably 2 to 50 mm, especially 3 to 20 mm.

Figure 8:
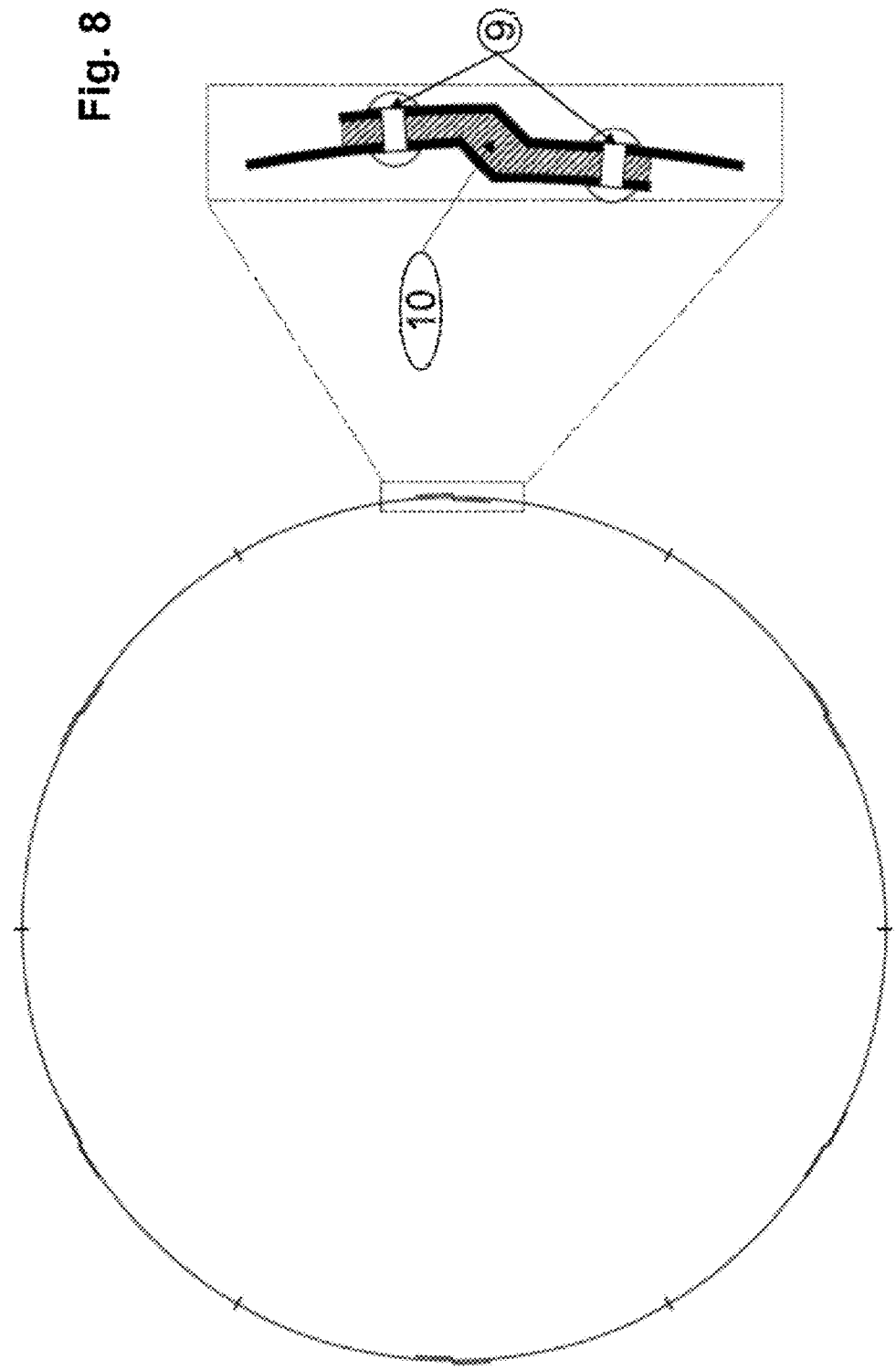
FIG. 8 shows a top view of an illustrative framework with one row of transverse elements.

Optionally, the ends of the adjacent transverse elements in circumferential direction may overlap (see FIG. 8). The size of the overlap is advantageously 200 to 20 mm. The lap joins are advantageously filled with a cement of high thermal stability and/or bonded with rivets, advantageously made of ceramic fiber composite materials, e.g. OCMC.

The transverse elements, in sheet or cylinder form, advantageously have a height of 100 mm to 5 m, preferably of 200 mm to 3 m, especially of 500 mm to 2 m (element height). The transverse elements advantageously have a length of 100 mm to 5 m, preferably of 250 mm to 3 m, especially of 500 mm to 2 m. The transverse elements advantageously have a thickness of 0.2 mm to 20 mm, preferably of 0.5 mm to 10 mm, especially of 1 mm to 5 mm.

Advantageously, the transverse elements which, in top view, form a polygon, preferably a regular polygon, or an ellipse, preferably a circle, have the same height, width and thickness.

Figure 5:
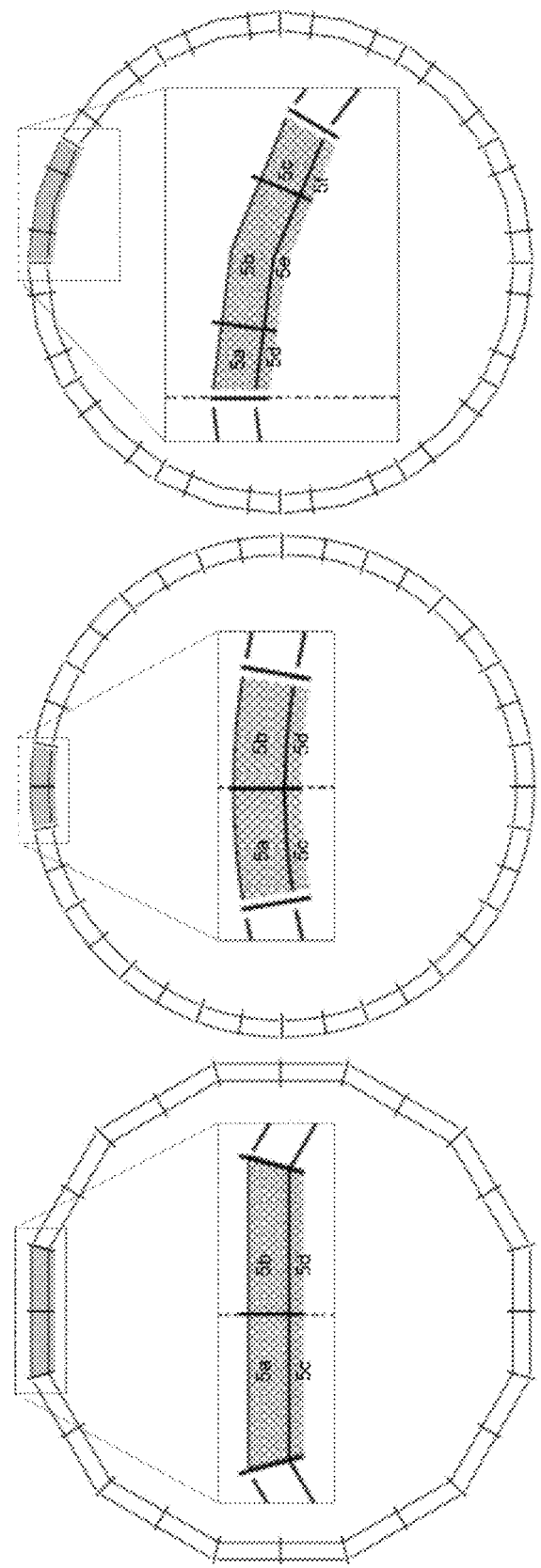
FIG. 5 shows top views of segmented frameworks formed from transverse elements, lateral elements and separating elements, with one transverse element per layer.

Advantageously, the modular framework has multiple layers formed from transverse elements and arranged one on top of another, in the form of uniform prisms or of a cylinder, advantageously one to 100, preferably two to 50, especially three to 30 layers (see FIGS. 4 and 5).

The total height of the superposed elements is advantageously 100 mm to 50 m, preferably 200 mm to 20 m, especially 500 mm to 10 m.

In a modular framework, the height of the transverse elements of all mutually superposed layers is advantageously identical (element height).

It is advantageously possible to use parallel transverse elements or transverse elements in concentric elliptical arc form, preferably parallel transverse elements or transverse elements in concentric circular arc form, which, in top view, are arranged as concentric polygons, preferably regular polygons, or concentric ellipses, preferably circles (see FIGS. 2 to 5). Advantageously, 2 to 20 parallel transverse elements or transverse elements in concentric elliptical arc form, preferably parallel transverse elements or transverse elements in concentric circular arc form, are used, preferably 2 to 5. The distance between the adjacent polygons in radial direction, preferably regular polygons, or the adjacent ellipses, preferably circles, composed of transverse elements is preferably between 10 mm and 1000 mm, preferably between 20 mm and 500 mm, more preferably between 40 mm and 250 mm. Advantageously, this distance is the same for all adjacent transverse elements in radial direction.

The lateral elements advantageously take the form of flat or corrugated rectangular sheets.

The corrugations may be sinusoidal or triangular. The amplitude is advantageously 1 mm to 100 mm, preferably 2 mm to 50 mm, especially 3 mm to 20 mm. The wavelength is advantageously 2 mm to 500 mm, preferably 5 mm to 200 mm, especially 10 mm to 100 mm.

The lateral elements are advantageously arranged orthogonally to the transverse elements.

The lateral elements advantageously have a height of 100 mm to 5 m, preferably of 200 mm to 3 m, especially of 500 mm to 2 m (element height). The lateral elements advantageously have a width of 50 mm to 2 m, preferably of 100 mm to 1 m, especially of 200 mm to 500 mm. The lateral elements advantageously have a thickness of 0.2 mm to 20 mm, preferably of 0.5 mm to 10 mm, especially of 1 mm to 5 mm.

In the case of multiple lateral elements arranged one on top of another, the middle lateral elements have the same height, width and thickness (see FIG. 6).

The height of the lateral elements in the middle layers advantageously corresponds to 90% to 110% of the element height of the transverse elements, preferably 95% to 105% of the element height of the transverse elements, more preferably 98% to 102% of the element height of the transverse elements, and is especially identical to the element height of the transverse elements. The height of the elements in the lowermost layer and in the uppermost layer may differ from the element height in the middle layers. Advantageously, the element height in the lowermost layer is 10% to 90%, preferably 20% to 75%, more preferably 30% to 60%, lower or higher than the element height of the middle elements. Advantageously, the element height in the uppermost layer is 10% to 90%, preferably 20% to 75%, more preferably 30% to 60%, higher or lower than the element height of the middle elements. When the lateral elements in the lowermost layer are lower than the middle lateral elements, the elements in the uppermost layer are advantageously higher in the same ratio than the middle lateral elements. When the lateral elements in the lowermost layer are higher than the middle lateral elements, the elements in the uppermost layer are advantageously lower in the same ratio than the middle lateral elements.

Advantageously, the upper edges of the lateral elements conclude flush with the upper edges of the transverse elements in the uppermost layer, meaning that the vertical offset in the upward or downward direction is advantageously less than 5%, preferably less than 2%, of the element height.

The width and thickness of the lowermost lateral elements and of the uppermost lateral elements are advantageously identical to the middle lateral elements.

Alternatively, in each layer, the upper edges of the transverse elements and of the lateral elements advantageously conclude flush, meaning that the vertical offset in the upward or downward direction is advantageously less than 5%, preferably less than 2%, of the element height. In each layer, the height of the transverse elements and of the lateral elements is advantageously identical. This configuration is particularly suitable for the use of flat elements.

Advantageously, in a modular framework, the number of lateral elements arranged one on top of another differs by less than 2 from the number of transverse elements arranged one on top of another; the number thereof is preferably identical.

The optional separating elements advantageously take the form of rectangular sheets.

The separating elements are advantageously arranged in the prism, preferably regular prism, between the adjacent transverse elements in circumferential direction, or in the cylinder, preferably in the circular cylinder (see FIGS. 4 and 5). Advantageously, the separating elements are inserted into the gaps that form in the prism, preferably uniform prism, between the adjacent transverse elements in circumferential direction, or in the cylinder, preferably in the circular cylinder.

The separating elements advantageously have a height of 100 mm to 5 m, preferably of 200 mm to 3 m, especially of 500 mm to 2 m. The separating elements advantageously have a length of 50 mm to 2 m, preferably of 100 mm to 1 m, especially of 200 mm to 500 mm. The separating elements advantageously have a thickness of 0.2 mm to 20 mm, preferably of 0.5 mm to 10 mm, especially of 1 mm to 5 mm.

The ratio of the lengths of the separating elements and of the lateral elements is advantageously from 0.9 to 1.25. The ratio of the heights of the separating elements and of the lateral elements is advantageously from 0.5 to 50, preferably from 0.75 to 10, more preferably from 0.9 to 5. Advantageously, the upper edges of the separating elements conclude flush with the upper edges of the transverse elements in the uppermost layer, meaning that the vertical offset in the upward or downward direction is advantageously less than 5%, preferably less than 2%, of the element height. Advantageously, the upper edges of the separating elements conclude flush with the upper edges of the lateral elements in the uppermost layer, meaning that the vertical offset in the upward or downward direction is advantageously less than 5%, preferably less than 2%, of the element height.

The optional flat elements, depending on the shape of the transverse elements, are advantageously in the form of trapezoidal sheets (in the case of rectangular transverse elements) or sheets in the form of a ring segment (in the case of transverse elements in the form of a circular arc).

The flat elements are advantageously inserted horizontally between two layers of transverse elements arranged one on top of the other (see FIG. 7). The flat elements advantageously have cutouts, preferably slots or openings, especially slots, such that these can be inserted into the lateral elements. Advantageously, the flat elements lie atop the upper edges of the transverse elements.

Trapezoidal flat elements advantageously have a base length of 100 mm to 5 m, preferably of 200 mm to 3 m, especially of 500 mm to 2 m. In addition, trapezoidal flat elements advantageously have a height of 50 mm to 2 m, preferably of 100 mm to 1 m, especially of 200 mm to 500 mm. The trapezium angle, i.e, the acute internal angle between the base and the limbs of the equilateral trapezium, is advantageously 30° to 88°, preferably 45° to 86°, especially 60° to 84°. By way of example, 87° is advantageous for 60 segments, 85.5° is advantageous for 40 segments, and 82.5° is advantageous for 24 segments. In addition, trapezoidal flat elements advantageously have a thickness of 0.2 mm to 20 mm, preferably of 0.5 mm to 10 mm, especially of 1 mm to 5 mm.

Flat elements in the form of a ring segment advantageously have an outer radius of 0.1 m to 10 m, preferably of 0.25 m to 7.5 m, especially of 0.5 m to 5 m. In addition, flat elements in the form of a ring segment advantageously have a width of 50 mm to 2 m, preferably of 100 mm to 1 m, especially of 200 mm to 500 mm. In addition, flat elements in the form of a ring segment have an angle sector of 6° to 120°, preferably of 9° to 90°, more preferably of 15° to 60°. In addition, trapezoidal flat elements advantageously have a thickness of 0.2 mm to 20 mm, preferably of 0.5 mm to 10 mm, especially of 1 mm to 5 mm.

The flat elements and separating elements may advantageously likewise be combined in one element (see FIG. 11).

The framework consists of framework elements that can advantageously be inserted into one another via cutouts, preferably slots or openings, especially slots. The transverse and lateral elements are advantageously inserted into one another in a crosswise manner (see FIGS. 4 and 5).

The framework of modular construction advantageously comprises, per segment and layer, one to twenty adjacent transverse elements in radial direction, preferably two to ten transverse elements, more preferably two to five transverse elements. The framework of modular construction advantageously comprises, per segment and layer, one to ten lateral elements, preferably one to five, more preferably one to three lateral elements (see FIG. 2).

The lateral elements and the transverse elements in the lowermost and middle layers are advantageously offset from one another in terms of height. The vertical offset between the upper edge of the lateral elements and of the transverse elements in a layer is from −90% to +90% of the element height, preferably from −75% to 75% of the element height, more preferably from −60% to +60% of the element height. Advantageously, the upper edges of the separating elements conclude flush with the upper edges of the transverse elements in the uppermost layer, meaning that the vertical offset in the upward or downward direction is advantageously less than 5%, preferably less than 2%, of the element height. As a result, they advantageously support one another and form a rigid, self-supporting profile composed of multiple segments. The transverse elements define the delimitation of the segments in radial direction, and the lateral elements define the delimitation of the segments in circumferential direction.

Advantageously, from 3 to 60, preferably from 4 to 40, more preferably from 6 to 24, identical segments per layer are formed. The segments are advantageously separated from one another by separating elements over the entire height (see FIG. 5).

The transverse elements advantageously have a cutout, preferably slot or opening, especially slot, for each lateral element arranged in the same layer of the same segment. In the case of a single lateral element, the cutout, preferably slot or opening, especially slot, is arranged in the middle of the transverse element. In the case of multiple lateral elements, the cutouts, preferably slots or openings, especially slots, are arranged symmetrically to the middle in the transverse elements, and the distance between them is advantageously from 5 mm to 2 m, preferably from 10 mm to 1 m, especially from 20 mm to 500 rm.

The lateral elements in the middle layers advantageously have a cutout, preferably slot or opening, especially slot, for each transverse element advantageously arranged in the same layer of the same segment. In the case of a single transverse element, the cutout, preferably slot or opening, especially slots, is advantageously arranged 5 mm to 2 m, preferably from 10 mm to 1 m, especially from 20 mm to 500 mm, from the rear edge of the lateral element facing the reactor shell. In the case of multiple transverse elements, the distance between two adjacent cutouts, preferably slots or openings, especially slots, is advantageously 10 mm to 2 m, preferably from 20 mm to 1 m, especially from 30 mm to 500 mm.

Advantageously, the cutouts, preferably slots or openings, especially slots, of all transverse elements are open in the downward direction. The length of the cutouts, preferably slots or openings, especially slots, of all transverse elements of a segment and of the lateral elements in the middle layers of a segment advantageously corresponds to 10% to 90% of the element height, preferably 25% to 75% of the element height, more preferably 40% to 60% of the element height, especially half the element height.

Advantageously, the cutouts, preferably slots or openings, especially slots, of the lateral elements in the middle layers are open in the downward direction. The length of the cutouts, preferably slots or openings, especially slots, in the lateral elements in the middle layers advantageously corresponds to 90% to 110% of the differential between the element height and length of the cutouts, preferably slots or openings, especially slots, of the transverse elements, preferably to 95% to 105% of the differential between the element height and length of the cutouts, preferably slots or openings, especially slots, of the transverse elements, more preferably to 98% to 102% of the differential between the element height and length of the cutouts, preferably slots or openings, especially slots, of the transverse elements; it is especially identical to the differential between the element height and length of the cutouts, preferably slots or openings, especially slots, of the transverse elements.

Advantageously, the lateral element does not have any cutouts in the lowermost layer. Its height advantageously corresponds to 90% to 110% of the height of the cutout in the transverse elements, preferably to 95% to 105% of the height of the cutout in the transverse elements, more preferably to 98% to 102% of the height of the cutout in the transverse elements; it is especially identical to the height of the cutout in the transverse elements.

The lateral element in the uppermost layer has a paired arrangement of cutouts, preferably slots or openings, especially slots, at the upper edge and at the lower edge. The length of the cutouts, preferably slots or openings, especially slots, corresponds to the length of the cutouts, preferably slots or openings, especially slots, in the lateral elements in the middle layers.

A box is understood to mean the region enclosed by two parallel transverse elements or transverse elements in the form of concentric elliptical arcs, preferably parallel transverse elements or transverse elements in the form of concentric circular arcs, that are adjacent in radial direction and the corresponding lateral elements, and the gap between the adjacent transverse elements in circumferential direction or the separating element advantageously inserted into this gap (hatched area sections 5a-b in FIG. 2; hatched area sections 5a-d in FIG. 3; hatched area sections 5a-f in FIGS. 4 and 5). In top view, the boxes advantageously have a rectangular cross section or a cross section in the form of a ring segment (see FIGS. 2-5).

Each segment advantageously has one to 50 boxes, preferably two to 25 boxes, especially three to fifteen boxes.

This modular framework system of the invention can advantageously be used as framework support for linings, especially for linings of chemical reactors for high-temperature processes in temperature ranges from 150° C. to 1900° C., preferably from 400° C. to 1700° C., especially from 600° C. to 1500° C.

This modular framework system of the invention can also advantageously as support structure for a catalyst, especially monolith catalysts (i.e. catalyst baskets that are used in fixed bed reactors with axial or radial flow).

In addition, the modular framework system of the invention may be used as electrical insulation, especially in a reactor interior.

Moreover, the modular framework system of the invention can be used as radiation shield.

In top view, the modular framework system of the invention divides the cross section of the reactor which is occupied by the lining into rectangular, trapezoidal or ring segment-shaped box profiles. The boxes are advantageously filled with refractory bricks and/or catalysts, especially monolith catalysts. Alternatively, the boxes remain unfilled.

The cross section in the top view of a box is advantageously filled with one to 2000 bricks, preferably with two to 500 bricks, more preferably with three to 200 bricks, which are arranged alongside one another and/or in succession. The sum total of the bricks within a box is referred to as packing. The packing in top view advantageously has a rectangular, trapezoidal or ring segment-shaped cross section, with the sides oriented in radial direction advantageously parallel to one another and the narrow side of the base advantageously directed inward.

The refractory bricks advantageously have hexahedral, preferably prismatic, shapes. Advantageously, the upper face and the lower face, and the front face and the rear face, are each parallel to one another. Advantageously, the upper face and lower face are at right angles to the other faces of the hexahedron.

The bricks are advantageously arranged in layers in radial direction. In radial direction, the packings advantageously comprise one to 40 layers, preferably one to 20 layers, more preferably one to 10 layers.

The bricks are advantageously arranged in layers in vertical direction. In terms of height, the packings comprise one to 1000, preferably one to 500, more preferably two to 200, especially three to 100, layers.

In circumferential direction, advantageously, 1 to 200 bricks, preferably 2 to 150 bricks, especially 3 to 100 bricks, are arranged alongside one another in a box.

Advantageously, the joins between the bricks in a packing are filled with mortar or adhesive, or they are executed as dry joins. Preferably, the joins between the bricks are executed as dry joins, meaning that no mortar or adhesive is used for the bonding of the shaped bricks.

Advantageously, the bricks in a packing are laid as a header course, as a stretcher course, as a soldier course, as a rowlock course, as a flat course, as a stretcher bond, as a header bond, as a block bond or as a cross bond (see "Feuerfestbau" from the Deutsche Gesellschaft Feuerfest- und Schornsteinbau e.V., page 76). Preferably, the bricks of a packing are laid as a stretcher bond, as a header bond, as a block bond or as a cross bond. More preferably, the bricks of a packing are laid as a block bond or as a cross bond.

A combination of the modes of laying from layer to layer in radial direction is also possible. For example, in the case of a packing having two layers, in radial direction, it is advantageously possible to execute the inner layer cross bond and the outer layer advantageously as soldier course. This combination achieves an offset between the joins between the bricks of a packing. In this way, gaps that possibly form between adjacent bricks are interrupted. In this way, incorrect flows of the gaseous reaction medium through the lining can be effectively reduced.

There is advantageously a gap between the bricks and the framework elements or between the bricks of different packings of the modular framework system. The gap between the bricks and the adjacent framework element or the gap between the bricks in circumferential direction of adjacent packings is advantageously from 1 mm to 50 mm, preferably from 1 to 25 mm, more preferably from 1 to 10 mm. The effect of this gap is that the individual bricks can move with respect to one another. This gap also simplifies the insertion of the bricks in the construction of the lining. In addition, the gaps offer the required space for the packing to thermally expand unhindered, i.e. in a stress-free manner.

Optionally, the gaps between the framework elements and the packing or the gaps between packings adjacent to the bricks in circumferential direction can be filled by insulation mats as described hereinafter.

Advantageously, the vertical offset between the upper edge of the packing and the upper edge of the framework is less than 50 mm, preferably less than 20 mm, more preferably less than 10 mm; the upper edge of the packing especially concludes flat with the upper edge of the framework, i.e. the vertical offset in the upward or downward direction is advantageously less than 5%, preferably less than 2%, of the height of the transverse element. This can be achieved, for example, by cutting of the bricks to a suitable size in one layer of the packing.

In general, there is a vertical offset between the layer joins of the packing and the joins between transverse elements of the lower and middle layers of a framework that are arranged one on top of another. The vertical offset between two transverse elements arranged directly one on top of another and the next layer join of the packing is advantageously 0% to 50% of one brick height, preferably 20% to 50% of one brick height.

In the specific case that flat elements are used, the join between two transverse elements arranged one on top of another is at the height of a layer join between two rows of bricks arranged one on top of another. The vertical offset between the join between two transverse elements arranged one on top of another and the closest layer join between two rows of bricks arranged one on top of another is advantageously less than 10 mm, preferably less than 5 mm, more preferably less than 3 mm.

The sides of the bricks may advantageously be flat. Alternatively, the sides may have suitably shaped appendages (tongue) and recesses (groove) and hence can be bonded to one another in a form-fitting manner by a tongue-and-groove connection (see DIN 1057).

The inner layer of the packing is advantageously in contact with the reaction zone on the front side and is advantageously bounded laterally and on the reverse side by the framework of the invention.

"Refractory bricks" in the present invention are understood to mean ceramic products and materials having use temperature of more than 600° C. By definition (DIN 51 060), only materials having a cone drop point greater than SK 17 (=ISO 150)—corresponding to about 1500° C.—can be referred to as refractory. This limiting temperature corresponds roughly to the melting point of iron and is of significance for the purposes of customs and mining law.

The bricks on the inside of the brick lining advantageously have the following profile of properties: (i) good heat insulation in the temperature range of 1000° C. to 1700° C., (ii) high strength, (iii) abrasion resistance, (iv) low open porosity. (v) thermal cycling stability, (vi) electrical insulation. Heat insulation is good at a thermal conductivity of less than 2 W/m/K, preferably less than 1 W/m/K. Strength is high at a cold compressive strength of greater than 5 MPa, preferably greater than 10 MPa. High abrasion resistance correlates with the hardness of the material. Open porosity in ceramic foams is low when the proportion of closed pores is greater than 1%, preferably greater than 5%, more preferably greater than 10%. Thermal cycling stability is high when the material passes the test according to DIN V ENV 820-3, Electrical insulation is good when the specific electrical resistance is greater than 109 Ωm, preferably greater than 1011 Ωm.

The properties of the bricks, especially composition, strength, shape and dimensions, are specified in DIN 1057 (Bricks for free standing chimneys), 1081 (Refractory products: Rectangular refractory bricks), 1082 (Refractory products: Arch bricks).

Refractory bricks are advantageously shaped bricks made of refractory materials. The material of the refractory bricks should advantageously be chosen depending on the process temperatures and process conditions. Moreover, the choice of material should advantageously be chosen depending on the radial position (layer) within the lining.

Preferably, the material of the inner layer in contact with media is made from ceramic foams or refractory materials according to the DIN EN 12475 classification, especially alumina-silica products, for example firebrick, corundum, mullite, cordierite or basic products, for example magnesia, magnesia-chromium oxide, magnesia spinel, magnesia-zircon or carbon-bound basic bricks, especially corundum, mullite, cordierite. Ceramic foams are described, for example, in DE 10 2015 202 277 and WO 07/22750. Particularly suitable are closed-pore, foamed ceramic materials that are given the Halfoam Alumina™ trade name.

Most preferably, the shaped bricks of the inner layer consist of the foamed ceramic material which is given the Halfoam Alumina™ trade name.

The present invention further relates to shaped bricks comprising ceramic foams, especially closed-pore foams. Advantageously, the shaped bricks of the invention include ceramic foams made of alumina-silica products, for example firebrick, corundum, mullite, cordierite or basic products, for example magnesia, magnesia-chromium oxide, magnesia spinel, magnesia-zircon or carbon-bound basic bricks, especially corundum, mullite, cordierite.

The present invention further relates to a brick assembly including multiple layers of brick packings arranged successively in radial direction.

The materials of a second layer from the inside advantageously have the following profile of properties: thermal stability above 1500° C., thermal conductivity less than 1 W/m/K, preferably less than 0.5 W/m/K, a cold compressive strength greater than 1 MPa, preferably greater than 2 MPa. This profile of properties is possessed by foams and cast or extruded lightweight refractory bricks. By way of example, commercial products such as Halfoam, Carath L®, PROMATON® are used in this layer.

The materials of a third layer from the inside advantageously have the following profile of properties: thermal stability above 1200° C., thermal conductivity less than 0.5 W/m/K, preferably less than 0.2 W/m/K, a cold compressive strength greater than 0.5 MPa, preferably greater than 1 MPa. This profile of properties is advantageously possessed by vacuum-formed fiberboards. By way of example, commercial products such as PROMATON® or ALTRA® are used in this layer.

The materials of a fourth layer from the inside advantageously have the following profile of properties: thermal stability above 1000° C., thermal conductivity less than 0.2 W/m/K, preferably less than 0.05 W/m/K, a cold compressive strength greater than 0.1 MPa, preferably greater than 0.2 MPa. This profile of properties is advantageously possessed by vacuum-formed fiberboards or boards of microporous fumed silica. For example, commercial products such as ALTRA® or MICROTHERM® are used in this layer.

The present invention further relates to a brick assembly including multiple brick packings arranged successively in radial direction and composed of (i) foamed ceramic and (ii) sintered cast or extruded ceramic or (i) foamed ceramic, (ii) sintered cast or extruded ceramic and (iii) compressed ceramic fibers or (i) foamed ceramic, (ii) sintered cast or extruded ceramic, (iii) compressed ceramic fibers and (iv) vacuum-formed fiberboards or boards including microporous fumed silica.

The surface of the inner layer of the lining, consisting of shaped bricks, preferably ceramic foams, may be untreated or coated. The coating advantageously serves to seal the surface of the lining and as abrasion protection. The coating, for example the protective layer, is advantageously applied to the end face and/or to the reverse side and/or to the top end and/or to the bottom end and/or to the left and right flank, preferably to the end face and/or to the reverse side and/or to the top end and/or to the bottom end, more preferably to the end face and/or to the reverse side, especially to the end face. The end face refers to the face of the shaped brick facing the reactor interior. The layer advantageously consists of refractory ceramics, for example $ZrO_2$, $YO_2$, $Si_3N_4$, $Al_2O_3$, preferably of $Al_2O_3$. The thickness of the protective layer is advantageously between 100 μm and 2 mm, preferably between 200 μm and 1 mm. The porosity (the empty space content) of the coating is advantageously <50%, preferably <25%, more preferably <10%, especially <5%. The coating can be applied to the shaped bricks by coating methods known to those skilled in the art, for example by painting methods, dip coating, flame spraying, plasma spraying.

Advantageously, the coating consists of a multilayer structure, for example of a thin layer of nonporous ceramic and one or more thicker layers of porous ceramic.

Examples of suitable coating materials are Aremco Coatings (coating slips): PP-634-AL, 634-SIC, 634-YO, 634-ZO, Oerlikon Metco (flame spraying and plasma spraying), LWK PlasmaCeramic (plasma coating), Polytec Cotronics (coating slips, casting compounds).

The shaped bricks advantageously have dimensions, known to those skilled in the art, according to DIN 1081 (1988) for rectangular bricks and/or DIN 1082 (1988) for arch bricks or wedge bricks. It is optionally possible to cut the bricks to individual dimensions.

In vertical direction, the refractory bricks may be of different height in different layers of a course. This can be accomplished, for example, in that the shaped bricks are laid alternately as soldier course and as stretcher course. In this way, it is possible to avoid (i) superfluous joins in regions with low axial temperature gradients or (ii) high mechanical stresses within individual bricks in regions with high axial temperature gradients.

The edges of the packing of refractory bricks are advantageously parallel to the adjoining framework elements or to the gaps between adjacent framework elements. The gap between the bricks and the adjacent framework element or the gap between packings adjacent to the bricks in circumferential direction is advantageously from 1 mm to 50 mm, preferably from 1 mm to 25 mm, more preferably from 1 mm to 10 mm. These gaps are advantageously filled at least partly with insulation mats made of mineral fibers.

The insulation mats are optionally secured to the flat sides of the framework elements. During installation, the insulation mats are advantageously welded into films and evacuated in a vacuum-tight manner. The mats thus prepared are advantageously bonded to the transverse elements and/or the lateral elements and/or the separating elements and/or the transverse elements, preferably to the transverse elements and/or lateral elements, more preferably to the transverse elements. After installation, the films are advantageously punctured. As a result, the mats expand and brace the bricks. This procedure is described, for example, in WO 2014/125024.

Materials having the following trade names are suitable for the insulation mats described: ALSIFLEX-1600, ALSIFLEX-1600 papers, PROMAFELT-1600, SILCAFLEX 160, THERMOFRAX blanket (flexible mats), THERMOFRAX board (vacuum moldings) or THERMOFRAX felt/paper (ceramic papers and felts).

Advantageously, the framework of the invention is supported by a foundation, for example a baseplate. The baseplate advantageously serves to anchor the modular framework and to absorb the weight of the refractory packing. The baseplate may alternatively be in one-part or segmented form. The baseplate is preferably segmented and each element advantageously bears a segment of the framework system of the invention.

As an alternative to the foundation, the framework of the invention may be fixed to the roof.

The baseplate is advantageously borne in a loose or fixed manner on the lower dome. Preferably, the baseplate is connected to the flange of the lower dome by a disconnectable connection. More preferably, the baseplate is screwed to the flange of the lower dome.

Advantageously, the baseplate is annular. Advantageously, the top side and bottom side of the baseplate are planar and parallel to one another. The thickness of the baseplate is 1 mm to 500 mm, preferably 2 mm to 300 mm, more preferably 3 mm to 200 mm.

The width of the ring is 50 mm to 2 m, preferably from 100 mm to 1 m, especially from 200 mm to 500 mm.

The outer edge of the baseplate, in top view, advantageously projects beyond the outer transverse elements of the OCMC framework. The excess of the outer edge of the baseplate with respect to the outer transverse element is advantageously 0 mm to 200 mm, preferably 5 mm to 100 mm, more preferably 10 mm to 50 mm. The inner edge of the baseplate, in top view, is advantageously covered by the inner layer of the lining. The excess of the inner edge of the lining with respect to the inner edge of the baseplate is advantageously 0 mm to 100 mm, preferably 0 mm to 50 mm, more preferably 0 mm to 20 mm.

The baseplate advantageously has grooves on the top side. The grooves advantageously serve as mounts for the support and guiding of the transverse elements, lateral elements and any separating elements in the lowermost layer of the framework. The arrangement of the grooves advantageously corresponds to the pattern of the framework elements in the top view of the framework.

The grooves advantageously have a depth of 1 mm to 500 mm, preferably 2 mm to 300 mm, more preferably 3 mm to 200 mm. The grooves advantageously have a width of 0.2 mm to 20 mm, preferably of 0.5 mm to 10 mm, especially of 1 mm to 5 mm. The grooves are advantageously 1% to 100%, preferably 2% to 50%, more preferably 5% to 20%, broader than the thickness of the framework elements used.

Advantageously, the lateral elements and the transverse elements of the lowermost layer of the framework are bonded in a fixed manner to the baseplate. The bond can be established, for example, in a force-fitting manner by screw connection, in a form-fitting manner by means of a dowel, or in a cohesively bonded manner by adhesive bonding.

Advantageously, the baseplate consists of metal, of plastic and/or of ceramic, preferably of metal, more preferably of steel.

Optionally, the surface of the baseplate is electrically conductive or electrically insulating. In the case of a metallic baseplate, the electrically insulating surface layer advantageously consists of enamel, of ceramic and/or of plastic. Preferably, the surface of the base plate is electrically insulating in regions. More preferably, the top side and the outer circumference of the baseplate are electrically insulating.

The baseplate advantageously bears securing elements for a lifting apparatus, with which the lining as a whole or in segments can be lifted out of the reactor and assembled.

It is advantageously possible to use what is called a multifunctional baseplate. This baseplate optionally has one or more of the following features: (i) The baseplate is advantageously continuous as far as the middle of the reactor. In the region of the reaction zone, the baseplate advantageously has openings for the flow of gas and solids. (ii) The baseplate is advantageously configured as a flange in the lower dome. (iii) The baseplate advantageously bears the lower electrode in the electrically heated moving bed reactor or fixed bed reactor.

An advantageous combination is one with thermal insulation on the inside of the reactor shell; for example by means of insulation boards encapsulated in metal shells. The insulation boards are advantageously porous with a total porosity greater than 45% and less than 99%, preferably greater than 60% and less than 99%, more preferably greater than 70% and less than 99%. Advantageously, the insulation boards comprise calcium silicate, vermiculite, rockwool, glass wool or fumed silica. The insulation boards are advantageously housed in closed metal shells. The metal shells advantageously consist of sheets that have become a closed shell by means of creasing, welding or soldering. The shells have advantageously been provided with securing elements on their reverse side, preferably hooks and/or loops. By means of these securing elements, they are advantageously suspended on the corresponding fixtures on the pressure-rated reactor shell.

The invention further relates to an apparatus, preferably a reactor, having the modular framework system of the invention and a pressure-rated reactor shell, preferably the modular framework system of the invention, a lining and a pressure-rated reactor shell.

The reactor cross section is advantageously from 0.005 $m^2$ to 200 $m^2$, preferably from 0.05 $m^2$ to 100 $m^2$, more preferably from 0.2 $m^2$ to 50 $m^2$, especially from 1 $m^2$ to 20 $m^2$. The height of the reactor shell is advantageously between 0.1 m and 100 m, preferably between 0.2 m and 50 m, more preferably between 0.5 m and 20 m, especially between 1 m and 10 m. The ratio of the height to the equivalent diameter of the reactor shell is advantageously from 0.01 to 100, preferably from 0.05 to 20, more preferably from 0.1 to 10, most preferably from 0.2 to 5. The wall thickness of the reactor shell is advantageously 1 mm to 300 mm, preferably 5 mm to 200 mm, more preferably 10 mm to 100 mm.

Preferred materials for the reactor shell are steel alloys, for example with materials number 1.4541, 1.4571.

Advantageously, there is a continuous gap between the modular framework system and the pressure-rated reactor shell. The gap width is advantageously 0 mm to 100 mm, preferably 2 mm to 50 mm, more preferably 5 mm to 50 mm.

The gap between the modular framework system and the pressure-rated shell may optionally be filled with a loose particle bed. The particles may be ceramic or metallic. The particles may be regular, for example spherical, cylindrical, prismatic, or irregular in shape. The particles may be solid, porous or hollow. The particles may be of the same or different size. The particles of the bed advantageously have an equivalent diameter of 0.05 mm to 100 mm, preferably of 0.1 mm to 50 mm, more preferably of 0.5 mm to 10 mm. The equivalent diameter of a particle is the diameter of a sphere of equal volume to the particle.

The gap between the modular framework system and the pressure-rated shell may optionally be purged by a directed gas stream. The purge gas used is advantageously $Co_2$, $H_2O$, $N_2$, $H_2$, $N_2$, lean air ($N_2$-diluted air) and/or Ar. The purge gas stream is advantageously introduced in an annular manner via the upper dome and drawn off via the baseplate of the lining. Alternatively, the purge gas stream is introduced in an annular manner via the baseplate of the lining and drawn off via the dome. The purge gas stream advantageously forms a gas curtain that separates the reaction zone from the pressure-rated reactor shell. This can prevent the formation of deposits on the inside of the pressure-rated reactor shell; in addition, the pressure-rated shell can be cooled.

Optionally, the modular framework system may be supported against the side wall of the pressure-rated shell. The supports may consist of OCMC, of monolithic ceramic, of a textile made of ceramic fibers, of metal or of a combination of these materials. They may be guided loosely between the framework and the side wall of the pressure-rated shell, or bonded in a fixed manner to the OCMC framework or to the pressure-rated shell of the reactor wall. The bond may be cohesive or form-fitting. The supports are preferably guided loosely between the These elements are preferably supported loosely between the modular framework system and the pressure-rated shell.

In a reactor with large axial temperature gradients, it may be advantageous to position the modular framework system solely in the region of the reactor where its function as a thermally and electrically insulating delimitation of the reaction volume having high thermal stability is required. The edge regions of the pressure-rated shell can in this case advantageously remain uninsulated.

Advantageously, the reactor is electrically heated (see PCT/EP2019/051466).

Advantageously, the apparatus of the invention has an upper, middle and lower apparatus section, wherein at least one electrode pair in a vertical arrangement is installed/arranged in the middle section and all electrodes are advantageously arranged/embedded in an electrically conductive solid packing. Advantageously, the upper and lower apparatus sections are in the form of domes and have a specific conductivity of $10^5$ S/m to $10^8$ S/m. The middle apparatus section is advantageously electrically insulated from the solid packing. Advantageously, the upper and lower apparatus sections are likewise electrically insulated from the middle apparatus section. Advantageously, the upper electrode is connected via the upper apparatus section and the lower electrode via the lower apparatus section, or the electrodes are each connected via one or more connecting elements in electrical contact with these sections. Advantageously, the ratio of the cross-sectional area of the upper and/or, preferably and, lower electrode to the cross-sectional area of the respective current-conducting connecting element or, without use of a connecting element, the ratio of the cross-sectional area of the upper and/or, preferably and, lower electrode to the cross-sectional area of the respective current-conducting apparatus section is 0.1 to 10, preferably 0.3 to 3, especially 0.5 to 2.

Preference is given to conducting the following high-temperature reactions in the apparatus of the invention, especially the reactor:

the preparation of synthesis gas by reforming of hydrocarbons with steam and/or carbon dioxide, coproduction of hydrogen and pyrolysis carbon by the pyrolysis of hydrocarbons. Suitable carrier materials are especially carbonaceous granules, silicon carbide-containing granules, nickel-containing metallic granules.

Preparation of hydrogen cyanide from methane and ammonia or from propane and ammonia. Suitable carrier materials are especially carbonaceous granules.

Preparation of olefins by steamcracking of hydrocarbons. Suitable carrier materials are especially carbonaceous granules, silicon carbide-containing granules.

Coupling of methane to give ethylene, acetylene and benzene.

Preparation of olefins by catalytic dehydrogenation of alkanes, for example propylene from propane or butene from butane. Suitable carrier materials are especially silicon carbide-containing granules coated with dehydrogenation catalysts or iron-containing shaped bodies.

Preparation of styrene by catalytic dehydrogenation of ethylbenzene. Suitable carrier materials are especially silicon carbide-containing granules coated with dehydrogenation catalysts or iron-containing shaped bodies.

Preparation of diolefins by the catalytic dehydrogenation of alkanes or olefins, for example butadiene from butene or from butane. Suitable carrier materials are especially silicon carbide-containing granules coated with dehydrogenation catalysts or iron-containing shaped bodies.

Preparation of aldehydes by catalytic dehydrogenation of alcohols, for example anhydrous formaldehyde from methanol. Suitable carrier materials are especially silver-containing granules or silicon carbide-containing granules coated with dehydrogenation catalysts or iron-containing shaped bodies.

Preparation of CO by the Boudouard reaction from $CO_2$ and carbon. Suitable carrier materials are especially carbonaceous granules.

Preparation of hydrogen and oxygen by catalytic water thermolysis over catalysts. Suitable carrier materials are especially silicon carbide-containing or iron-containing granules coated with a cleavage catalyst, for example a ferrite.

FIGURES

FIG. 1: Diagram of a reactor segment consisting of a pressure-rated reactor shell around an OCMC framework filled with refractory bricks.

Legend

1=packing composed of three transverse elements
2a=lateral elements in the middle layers
2b=lateral elements in the lowermost layer
2c=lateral elements in the uppermost layer
6=packing of refractory bricks inserted into the boxes of the OCMC framework
8=pressure-rated reactor shell FIG. 2: Top view of a segment of a segmented framework formed from transverse elements (1) and lateral elements (2) with four transverse elements and three lateral elements per layer. The transverse elements are executed as circular cylinder shells, the lateral elements as flat sheets.

FIG. 3: Top view of segmented frameworks formed from transverse elements and lateral elements with one transverse element per layer.

On the left: 12 segments, transverse elements executed as flat sheets, one lateral element per transverse element In the middle: 18 segments, transverse elements executed as circular arcs, one lateral element per transverse element On the right: 12 segments, transverse elements constructed as angled shells, two lateral elements per transverse element The hatched region in each case describes the extent of a segment The sections labeled 5a, 5b, 5c . . . are the boxes that are formed by the framework elements in a segment.

FIG. 4: Top view of segmented frameworks formed from transverse elements and lateral elements with two transverse elements per layer.

On the left: 12 segments, transverse elements executed as flat sheets, one lateral element per transverse element In the middle: 18 segments, transverse elements executed as circular arcs, one lateral element per transverse element On the right: 12 segments, transverse elements constructed as angled shells, two lateral elements per transverse element The hatched region in each case describes the extent of a segment The sections labeled 5a, 5b, 5c . . . are the boxes that are formed by the framework elements in a segment.

FIG. 5: Top view of segmented frameworks formed from transverse elements, lateral elements and separating elements with one transverse element per layer.

On the left: 12 segments, transverse elements executed as flat sheets, one lateral element per transverse element, one loose separating element in each gap between the segments.

In the middle: 18 segments, transverse elements executed as circular arcs, one lateral element per transverse element, one loose separating element in each gap between the segments.

On the right: 12 segments, transverse elements constructed as angled shells, two lateral elements per transverse element, one loose separating element in each gap between the segments.

The hatched region in each case describes the extent of a segment

The sections labeled 5a, 5b, 5c . . . are the boxes that are formed by the framework elements in a segment.

FIG. 6: Perspective diagram of a segment in a framework consisting of transverse elements and lateral elements in sheet form. In radial direction, three transverse elements are arranged in succession and connected by a central lateral element. The framework consists of six layers.

In the middle: Framework elements, transverse elements with slot on the top side (1, height h), lateral element of the middle layers (2a, height h), of the lower layer (2b, height 1.5 h) and of the upper layer (2c, height 0.5 h). As a result of the different heights of the lower and upper lateral elements, the framework elements of the different layers are intermeshed.

On the right: Perspective diagram of a section of a segment consisting of transverse elements, lateral elements and a packing of refractory bricks embedded in insulation mats Legend 1=packing composed of three transverse elements
2a=lateral elements in the middle layers
2b=lateral elements in the lowermost layer
2c=lateral elements in the uppermost layer
6=packing of refractory bricks inserted into the boxes of the OCMC framework
8=insulation mats for fixing of the package of refractory bricks in the OCMC framework FIG. 7: Perspective diagram of a segment in a framework consisting of transverse elements, lateral elements and flat elements in sheet form. In radial direction, three transverse elements are arranged in succession and connected by a central lateral element. The framework consists of four layers. Transverse elements have been inserted between the layers.

On the right: Framework elements, transverse elements with a slot on the underside (1, height h), lateral elements with slots on the top side (2, height h), flat elements with a slot on the inside (3).

Legend

1=packing composed of three transverse elements
2=lateral elements
3=flat elements FIG. 8 (corresponding to the example "Framework with one row of transverse elements"): Top view of an illustrative framework with one row of transverse elements. The enlarged diagram shows a detail of the lap joint between adjacent transverse elements.

Legend

9=rivets
10=joining cement

FIG. 9 (corresponding to the example "Framework with many transverse elements as radiation shields"):

On the left: Top view of an illustrative framework having many rows of transverse elements in radial direction.

On the right: Detailed side view of a lateral element (2) and a bundle of transverse elements (1) that are inserted into the lateral element.

Figure 10:
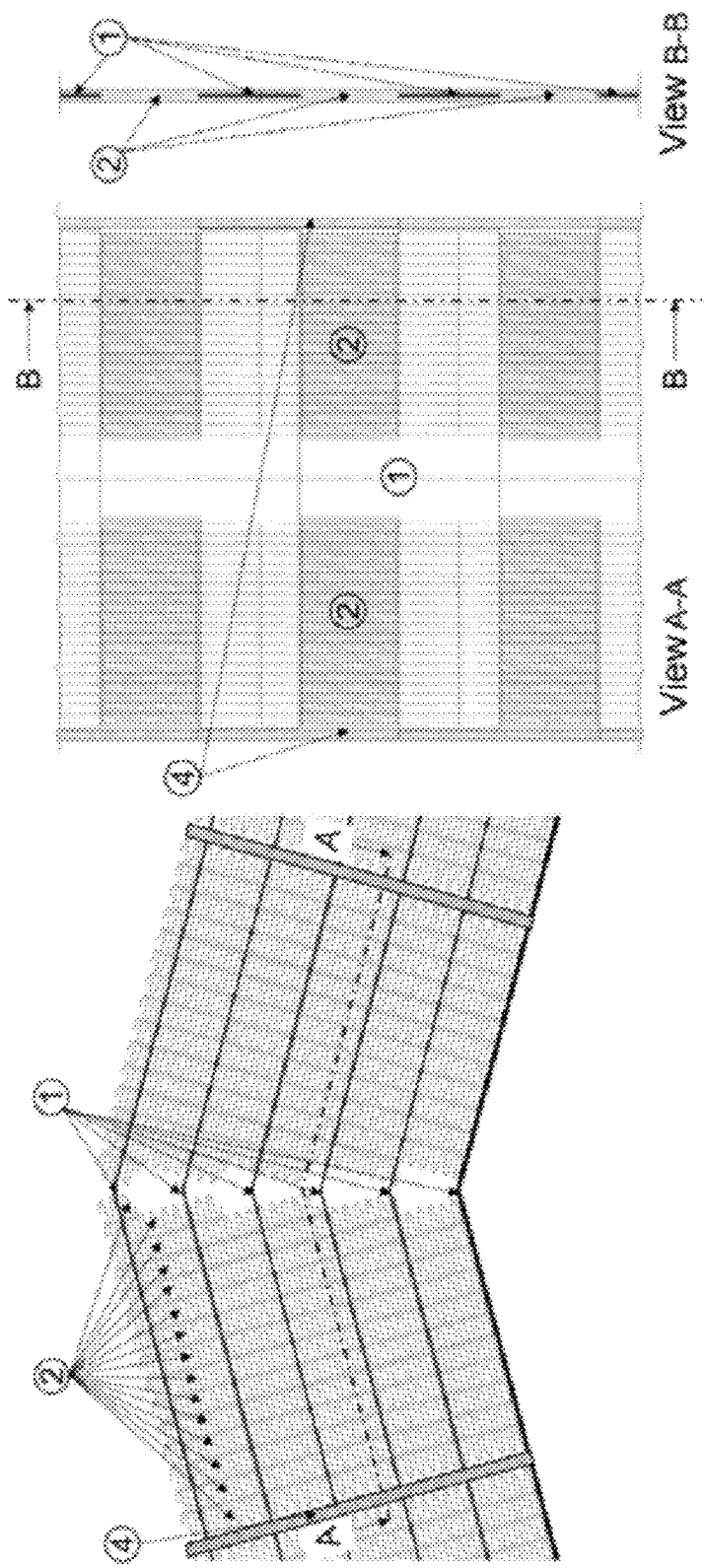
FIG. 10 shows a framework with profiled lateral elements.

FIG. 10 (framework with profiled lateral elements):

On the left: Top view of a segment of an illustrative framework with many profiled lateral elements and separating elements.

In the middle: Front view of multiple layers arranged one on top of another.

On the right: Side view of multiple layers arranged one on top of another.

Legend

1=transverse elements
2=profiled lateral elements
4=separating elements

FIG. 11: Perspective diagram of complex framework element forms:

At the top: Combination of flat element and separating element.

In the middle: Combination of flat element, separating element and one transverse element (on the outside).

At the bottom: Combination of flat element, separating element and two transverse elements (on the inside and outside).

Figure 12:
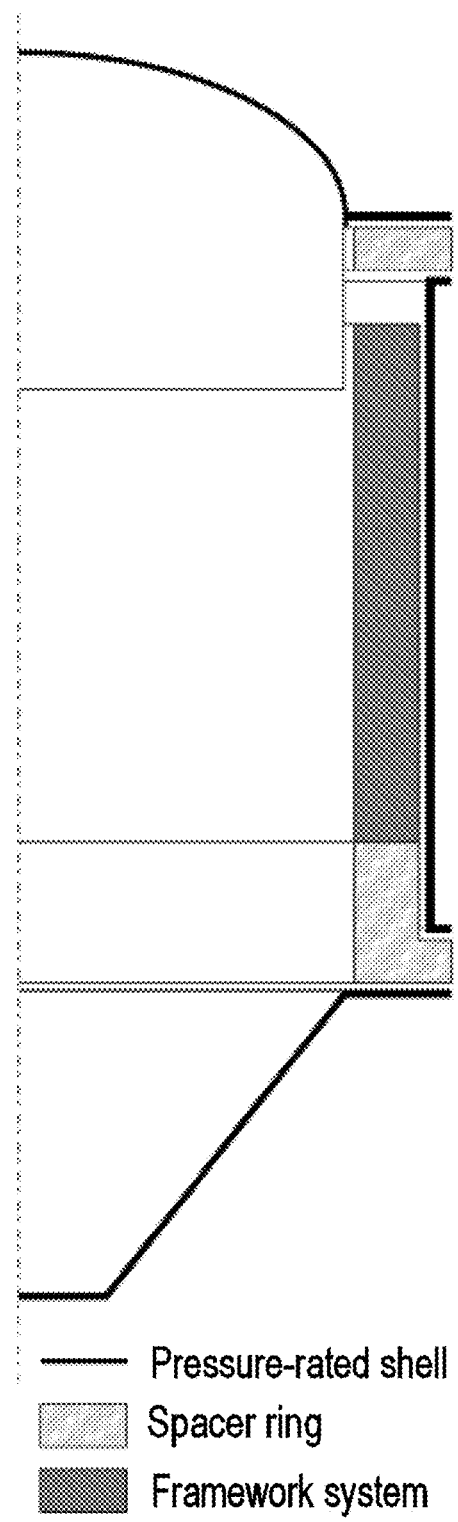
FIG. 12 shows a diagram of a reactor with a truncated framework system in relation to the length of the pressure-rated shell.

FIG. 12: Diagram of a reactor with a truncated framework system in relation to the length of the pressure-rated shell.

Fiber-reinforced oxide ceramics, especially OCMC, combine high thermal stability with high strength, ductility and thermal shock stability. The material retains these properties permanently up to more than 1200° C. At higher temperatures, the material gradually becomes brittle, but it retains its shape and significant residual strength. Moreover, these materials feature low thermal conductivity and low electrical conductivity that qualify these materials as insulators. A framework made of OCMC forms a barrier, which separates the packing of a reactor, a hot fixed bed or a fluidized bed (moving bed or fluidized bed), from the pressure-rated reactor wall. If electrical current is guided through the reactor packing, the OCMC framework also forms an effective electrical insulation between the reactor packing and the pressure-rated shell. The form-fitting bond between the framework elements enables stress-free thermal expansion of the framework. This means that it is possible to control operating conditions in the reactor that are characterized by high temperatures and significant temperature gradients in terms of place and time.

The properties of the novel materials of the foamed ceramics and fiber-reinforced oxide ceramics, especially Halfoam and OCMC, bring the following advantages:

Foamed ceramics, especially Halfoam, combine high strength and trueness of shape with a good thermal insulating action, specifically at high temperature >1000° C. The material is usable up to 1700° C.

Fiber-reinforced oxide ceramics, especially OCMC, combine high thermal stability with high strength and ductility. The material retains these properties permanently up to more than 1200° C. At higher temperatures, the material gradually becomes brittle, but it retains its shape and significant residual strength.

By combination of the two materials, it is possible to implement a self-supporting, lightweight lining for pressure reactors. Forces that act on the lining are absorbed by the OCMC framework. This allows the shaped bricks to be laid loose, such that they can move flexibly with respect to one another in the event of thermal expansion. The purely form-fitting joining of the OCMC framework and the refractory packing enables a yielding construction that can deform with low stress in the event of significant temperature changes (in terms of place or time).

The thermal insulation effect of the Halfoam bricks enables reduction in the temperature from 1500° C. (reaction zone temperature) to less than 1200° C. in a thin layer. This results in multiple advantages:

The lining can have a thinner execution and is much lighter compared to the prior art.

The framework elements of the support framework made of OCMC are effectively protected from aging.

Since OCMC has low thermal conductivity, thermal bridges are eliminated by the fin action of the support framework.

Foamed ceramics and fiber-reinforced oxide ceramics, especially Halfoam and OCMCs based on AlOx, have identical coefficients of thermal expansion. As a result, the gaps in the lining remain unchanged across the entire temperature range and prevent undefined leakage currents through the lining.

The embedding of the refractory packings by insulation mats in the OCMC framework enables jointless but flexible and thermal cycling-resistant connection.

As a result of the intrinsic stability achieved, the lining does not require any support by the pressure-rated reactor shell. As a result, it is possible to form a continuous gap between the lining and the reactor shell.

The lining can be assembled and disassembled separately from the reactor shell. As a result, the assembly of the reactor and the repair and exchange of elements subject to wear is simplified. More particularly, the lining can be preassembled outside the reactor and lifted complete into the reactor. As a result, the shutdown time of the reactor is minimized in the event of repair or renewal of the lining.

In the case of electrically heated reactors: The materials of the lining are electrical insulators and constitute an effective insulation layer between the bed in the reaction zone and the pressure-rated reactor shell.

The gap between the lining and the reactor shell assures an additional, reliable, temperature-independent electrical insulation between the bed and the reactor shell.

The coating on the inside of the lining by a nonporous and smooth outer layer has positive accompanying effects:

The outer layer gives effective wear protection against abrasion by particles, for example of a moving bed. The smooth surface of the outer layer makes it difficult for solid deposits to form on the wall. Deposits adhere only loosely to the surface and can be detached by the particle movement of the moving bed.

The permeability of the wall for the bypass of gases from the reaction zone is reduced.

The multilayer structure composed of a thin layer of nonporous ceramic and one or more thick layers of porous ceramic is tolerant to cracking as a result of thermal shock.

The layer-by-layer construction of the lining allows the use of different insulation materials in the individual layers each with an optimal profile of properties with regard to the thermal insulation effect and thermal stability.

The division of the lining in radial direction by the parallel or concentric transverse elements of the OCMC framework enables a failure-tolerant mode of operation: Even when parts of the refractory packing break, layers remain intact, and these prevent the breakthrough of the hot bed out of the reaction zone as far as the pressure-rated reactor shell and hence enable controlled shutdown of the damaged reactor.

Of relevance particularly in the case of pressure reactors: The optional sealing of the surface of the OCMC sheets and/or of the refractory bricks suppresses the formation of large-area convection cycles, which would distinctly reduce the insulation effect of the lining.

EXAMPLES

Prior Art:

An industrial reactor was lined with a multilayer lining of refractory concrete. The reaction zone had diameter 3000 mm. The electrodes for supply of electricity to the bed were in a vertical arrangement spaced apart from one another by 3000 mm. The lining consisted of the following layers:

| Material | Layer thickness in mm | Thermal conductivity in W/m/K |
|---|---|---|
| COMPRIT A95RF-6 | 75 | 2.88 |
| LEGRIT 180-1.4 H 0-3 | 125 | 0.97 |
| PYROSTOP BOARD 1600 | 50 | 0.4 |
| PYROSTOP BOARD 1260 | 50 | 0.28 |

The lining was anchored to the reactor shell. The pressure-rated reactor shell had an internal diameter of 3640 mm. According to the design, the heat transfer coefficient of the lining was 2.14 W/(m² K). According to the design, the power loss from the reactor was supposed to be 32 kW/m of reactor length and the temperature on the outside of the reactor 75° C. In reactor operation at a maximum temperature of 1400° C. and at an operating pressure of 1.6 bar absolute, the heat losses had risen to values up to 84 kW/m and the temperature on the outside of the reactor had risen locally up to 300° C. On opening of the reactor, cracks were found in the lining. The visible cracks on the inside of the reactor wall ran irregularly and varied in size and extent. The longest cracks measured 1000 mm; the greatest crack width measured 3 mm. The lining had broken away in places. This gave rise to recesses in the lining having an area of 500 cm² and a depth of up to 5 cm. This damage was explained by the deterioration in the insulating effect of the lining. As a result, there was a deterioration in the reactor performance and the energy consumption of the process. In addition, the pressure-rated reactor shell was weakened by the excess increase in temperature. For these reasons, safe continuation of operation of the reactor was not possible.

Example 1: Use as a Modular Framework of the Invention as Electrical Insulation in the Reactor Interior This example shows the simplest configuration of the solution of the invention. A moving bed reactor with a resistance-heated bed serves, for example, for pyrolysis of hydrocarbons. The reaction zone has diameter 3000 mm. The electrodes for supply of electricity to the bed are in a vertical arrangement spaced apart from one another by 3000 mm. The pressure-rated reactor shell has an internal diameter of 3100 mm. The reactor shell is equipped with a cooling coil on the outside, through which water flows, such that the shell temperature is controlled to max. 50° C. The reaction zone is bounded by a modular framework. The framework elements of the framework are made of OCMC. The framework consists of a row of transverse elements that are each supported by a lateral element. All framework elements are 3 mm thick. The framework comprises six segments and five layers arranged one on top of another. The transverse elements of adjacent segments overlap one another in circumferential direction. The lap joints are filled with a cement of high thermal stability and connected by rivets. As a result, the framework forms a dustproof occlusion of the reaction zone from the annular space between the framework and the pressure-rated reactor shell. $CO_2$ flows as purge gas within the annular space between the framework and the pressure-rated reactor shell. The temperature in the center of the reaction zone is 1400° C. The temperature of the framework is 425° C. This solution is notable for compact and lightweight design. The reaction zone takes up 93.5% of the cross section encased by the pressure-rated shell. The weight of the framework consisting of the OCMC elements is 250 kg. In addition, the framework fulfills the function as electrical insulation of the reaction zone against the pressure-rated reactor wall. At the same time, the framework has a minor thermal insulation effect. As a result, a sufficiently low temperature is established on the inside of the framework that the framework is kept clean with respect to carbonaceous deposits. This enables a reliable steady-state mode of operation of the process.

Example 2: Use as a Modular Framework of the Invention as Radiation Shield

This example shows a configuration of the solution of the invention that envisages a framework consisting of OCMC elements. A moving bed reactor with a resistance-heated bed serves, for example, for pyrolysis of hydrocarbons. The reaction zone has diameter 3000 mm. The electrodes for supply of electricity to the bed are in a vertical arrangement spaced apart from one another by 3000 mm. The pressure-rated reactor shell has an internal diameter of 3700 mm. The reactor shell is uninsulated on the outside. The reaction zone is bounded by a framework of OCMC elements. The framework comprises twelve segments in circumferential direction and ten layers arranged one on top of another. Each layer in each segment comprises 60 rows of transverse elements each supported by a lateral element. The transverse elements of the inner row that are in direct contact with the reaction zone are 3 mm thick. The inside of these transverse elements is coated with a plasma-sprayed protective layer. The transverse elements of adjacent segments in the inner row overlap one another in circumferential direction. The lap joints are filled with a cement of high thermal stability and connected by rivets. In the other rows, the transverse elements are each 1 mm thick and are at a radial distance of 2 mm from one another. The ends of these transverse elements are loose. The lateral elements are 3 mm thick. $CO_2$ flows as purge gas within the annular space between the framework and the pressure-rated reactor shell. This solution is notable for a comparatively lightweight design of excellent mechanical robustness. The overall framework consists of OCMC, which is ductile and resistant to thermal shock. The framework elements that have been inserted into one another form a mechanically stable framework that can simultaneously compensate for deformations resulting from thermal stress. The weight of the framework is about 1.6 tn/m of reactor length. In addition, the framework fulfills the function as electrical insulation of the reaction zone against the pressure-rated reactor wall. In addition, the framework is effective as thermal insulation, with the transverse elements arranged in a row from the inside outward functioning as radiation shields. The narrow distance between the transverse elements results in stagnation of the gas layers, which assists the insulating action. The temperature in the center of the reaction zone is 1350° C. The temperature on the inside of the framework is 1200° C. The heat losses from the insulation are 45 kW/m of reactor length. The temperature of the pressure-rated reactor shell is 85° C.

Example 3 (Halfoam and Lightweight Refractory Bricks)

This example shows a solution of the invention which is directly comparable to the base configuration. This is a 320 mm-thick lining consisting of three layers in radial direction. The inner layer consists of HALFOAM from the manufacturer Morgan Advanced Materials Haldenwanger GmbH. The second layer consists of shaped bricks of the PROMATON 28 type from the manufacturer Etex Building Performances GmbH, The third layer consists of shaped bricks of the PROMATON 26 type from the same manufacturer. The bricks are laid as a stretcher bond. The OCMC framework consists of 18 segments having circular cross section. One segment consists of one lateral element and of two transverse elements. The inner transverse element has a diameter of 3.63 m and encompasses the inner layer of the lining. The outer transverse element has a diameter of 4.09 m and encompasses the two outer layers of the lining. The weight of the lining is about 3.35 tn/m. Between the outer transverse element and the reactor wall, a gap having a width of 20 mm is formed. The temperature in the center of the moving bed is around 1500° C. The table shows the radial temperature progression in the lining.

| Layer | Material | Internal diameter [m] | Layer thickness [mm] | Maximum temperature [° C.] | Average temperature [° C.] |
|---|---|---|---|---|---|
| Reaction zone | Moving bed | 0 | 1700 | 1500 | 1440 |
| Insulation layer 1 | Halfoam | 3.4 | 114 | 1379 | 1256 |
| Insulation layer 2 | Promaton 28 | 3.63 | 114 | 1133 | 919 |
| Insulation layer 3 | Promaton 26 | 3.86 | 114 | 706 | 392 |
| Reactor wall | Steel | 4.13 | 20 | 78 | 78 |

The heat losses based on length at a temperature of 1500° C. in the center of the reactor are 15.2 kW/m.

In this configuration, the inner layer of the lining reduced the temperature considerably: T=244 K. As a result, the temperature as far as the inner transverse element has fallen to such an extent that the OCMC material is not subject to any significant aging.

The lining of the invention is considerably lighter than the reference configuration in example 1. Further advantages of the configuration of the invention over the reference configuration are apparent from the thermally insulating effect of the first lining layer:

1. The temperature field over the cross section of the moving bed is more homogeneous with a temperature differential between axis and wall of ΔT=73 K.
2. The temperature on the outside of the first lining layer is lowered to well below 1200° C., such that a support framework made of OCMC materials permanently retains its advantageous mechanical properties. A further advantage is the lower temperature at the reactor wall. These advantages can be attributed to the superior insulation properties of HALFOAM compared to refractory bricks made of K99 alumina.

Example 4 (Halfoam, Lightweight Refractory Bricks and Superinsulation)

This example shows an optimized version of the solution of the invention with regard to insulating effect and weight. This is a 320 mm-thick lining consisting of four layers in radial direction. The two inner layers consist of HALFOAM from the manufacturer Morgan Advanced Materials Haldenwanger GmbH. The third layer consists of shaped bricks of the PROMATON 28 type from the manufacturer Etex Building Performances GmbH. The fourth layer is composed of MICORTHERM PANEL from the manufacturer Etex Building Performances GmbH, and these are bonded on the outside of the outer transverse elements. The bricks are laid as a stretcher bond. The OCMC framework consists of 18 segments having circular cross section. One segment consists of one lateral element and of two transverse elements. The inner transverse element has a diameter of 3.63 m and encompasses the two inner layers of the lining. The outer transverse element has a diameter of 4.03 m and encompasses the third layer of the lining. The weight of the lining is about 3.2 tn/m. Between the outer transverse element and the reactor wall, a gap having a width of 20 mm is formed. The temperature in the center of the moving bed is around 1500° C. The table shows the radial temperature progression in the lining.

The superinsulation was secured in cassettes on the reactor wall.

| Layer | Material | Internal diameter [m] | Layer thickness [mm] | Maximum temperature [° C.] | Average temperature [° C.] |
|---|---|---|---|---|---|
| Reaction zone | Moving bed | 0 | 1700 | 1500 | 1464 |
| Insulation layer 1 | Halfoam | 3.4 | 89 | 1427 | 1368 |
| Insulation layer 2 | Halfoam | 3.58 | 114 | 1309 | 1238 |

-continued

| Layer | Material | Internal diameter [m] | Layer thickness [mm] | Maximum temperature [° C.] | Average temperature [° C.] |
|---|---|---|---|---|---|
| Insulation layer 3 | Promaton 28 | 3.81 | 114 | 1168 | 1051 |
| Insulation layer 4 | Microtherm | 4.03 | 25 | 933 | 496 |
| Reactor wall | Steel | 4.13 | 0 | 58 | 58 |

The heat losses are 9.15 kW/m, i.e. are much lower than in the configurations of examples 1 and 2. In this configuration, the two inner layers of the lining lower the temperature to such an extent that the OCMC material does not undergo any significant aging. The third layer lowers the temperature to such an extent that it is possible to use a superinsulation that has a very strong insulating effect but thermal stability limited to about 1000° C.

The lining of the invention is lighter than the configuration of the invention in example 2. Further advantages of the configuration of the invention over the configuration in example 2 are the more homogeneous temperature field over the cross section of the moving bed (temperature differential: $\Delta T=36$ K) and the lower temperature at the reactor wall (T=58° C.). As a result, it is possible to dispense with touch protection on the outside of the reactor, which reduces costs and improves the accessibility of the reactor.

The invention claimed is:

1. An apparatus, comprising:
   at least one pressure-rated apparatus shell; and
   at least one modular framework system comprising two different types of framework elements and being arranged within the apparatus shell;
   wherein multiple transverse elements form at least one prism or one cylinder and multiple lateral elements project into the interior of the prism or cylinder;
   wherein the multiple transverse elements and the multiple lateral elements can be inserted into one another and/or can be connected with the aid of one or more connecting elements;
   wherein a material of the framework elements comprises a ceramic fiber composite material.

2. The apparatus according to claim 1, wherein the at least one modular framework system is self-supporting.

3. The apparatus according to claim 1, wherein the material of the framework elements comprises an oxidic fiber composite material.

4. The apparatus according to claim 1, wherein the transverse elements take the form of corrugated, angled, or flat sheets or of cylindrical shells, and
   the lateral elements take the form of corrugated or flat sheets.

5. The apparatus according to claim 1, wherein the apparatus has multiple layers formed from transverse elements and arranged one on top of another.

6. The apparatus according to claim 1, wherein multiple parallel transverse elements or transverse elements in the form of concentric elliptical arcs in a radial direction are used, and in a top view these are arranged as concentric polygons, or concentric ellipses.

7. The apparatus according to claim 1, wherein separating elements can be inserted into gaps between adjacent transverse elements in a circumferential direction.

8. The apparatus according to claim 1, wherein flat sheets can be interleaved between two layers of transverse elements arranged one on top of the other.

9. The apparatus according to claim 1, wherein the apparatus is supported by a foundation and is connected thereto by a disconnectable connection.

10. The apparatus according to claim 1, wherein the apparatus has a lining of refractory bricks and; or catalysts arranged within the modular framework system.

11. The apparatus according to claim 10, wherein the framework system can be divided into boxes,
    wherein a box is understood to mean the region enclosed by two parallel transverse elements or transverse elements in a form of concentric elliptical arcs that are adjacent in a radial direction and the corresponding lateral elements, and
    wherein there is a gap between adjacent transverse elements in a circumferential direction wherein a separating element can be advantageously inserted into this gap; and
    wherein the boxes are each filled with 1 to 2000 refractory bricks or with catalysts; and
    wherein the bricks are arranged in a form of layers in the vertical and horizontal directions and there is a gap between the bricks and framework elements that bound the box.

12. The apparatus according to claim 10, wherein the lining of refractory bricks comprises a brick assembly comprising multiple brick packings arranged successively in a radial direction and comprising
    (i) foamed ceramic and (ii) sintered cast or extruded ceramic; or
    (i) foamed ceramic, (ii) sintered cast or extruded ceramic, and (iii) compressed ceramic fibers; or
    (i) foamed ceramic, (ii) sintered cast or extruded ceramic, (iii) compressed ceramic fibers, and (iv) vacuum-formed fiberboards or boards comprising microporous fumed silica.

13. The apparatus according to claim 10, wherein a gap between the bricks and adjacent framework elements and/or a gap between brick packings that are adjacent in a circumferential direction is at least partly filled with insulation mats.

14. The apparatus according to claim 1, wherein there is a continuous gap between the modular framework system and the pressure-rated apparatus shell.

15. The apparatus according to claim 14, wherein the gap is purged by a directed gas stream.

16. A method of reacting compounds, the method comprising:
    preparing compounds in the apparatus according to claim 1, wherein a preparation is selected from the group consisting of
    preparation of synthesis gas by reforming hydrocarbons with steam and/or carbon dioxide,
    preparation of hydrogen and carbon as coproducts by pyrolysis of hydrocarbons,
    preparation of hydrogen cyanide from methane and ammonia or from propane and ammonia,
    preparation of olefins by steamcracking of hydrocarbons,
    coupling of methane to give ethylene, acetylene and/or benzene,
    preparation of olefins by dehydrogenation of alkanes,
    preparation of styrene by dehydrogenation of ethylbenzene, preparation of diolefins by dehydrogenation of alkanes or olefins,
preparation of aldehydes by dehydrogenation of alcohols,
preparation of carbon monoxide by Boudouard reaction from carbon dioxide and carbon, and
preparation of hydrogen and oxygen by water thermolysis over catalysts.

* * * * *